US005654614A

United States Patent [19]

Flückiger et al.

[11] Patent Number: 5,654,614

[45] Date of Patent: Aug. 5, 1997

[54] SINGLE-MOTOR SETTING AND PRINTING POSTAGE METER

[75] Inventors: Daniel Flückiger, Zäziwil; Philippe Chollet, Corcelles; Christian Gillieron, Fraubrunnen; Christian Moy, Grossaffoltern; Martin Müller, Langenthal; Heinz Wüthrich, Heimiswil, all of Switzerland

[73] Assignee: Ascom Hasler Mailing Systems AG, Bern, Switzerland

[21] Appl. No.: 422,155

[22] Filed: Apr. 14, 1995

[51] Int. Cl.$^{6}$ .......... H02P 1/00

[52] U.S. Cl. .......... 318/280; 318/10; 318/15; 101/71; 101/84; 101/93.17

[58] Field of Search .......... 101/71, 91, 78, 101/84, 93.17, 93.18, 93.24; 92/41 R, 48.92; 310/10, 15, 280; 388/907.5; 318/283, 286, 569, 600

[56] References Cited

U.S. PATENT DOCUMENTS

| | | | |
|---|---|---|---|
| 4,057,134 | 11/1977 | Gatewood | 192/41 R X |
| 4,274,750 | 6/1981 | Smit | 318/10 |
| 4,579,054 | 4/1986 | Buan et al. | 101/91 |
| 4,639,581 | 1/1987 | Berger et al. | 235/101 |
| 4,646,635 | 3/1987 | Salazar et al. | 101/91 |
| 4,730,821 | 3/1988 | Flückiger | 270/58 |
| 4,807,139 | 2/1989 | Liechti | 364/464.02 |
| 4,887,807 | 12/1989 | Berger et al. | 271/171 |
| 5,038,153 | 8/1991 | Liechti et al. | 346/140 |
| 5,060,821 | 10/1991 | Berger et al. | 221/190 |
| 5,203,263 | 4/1993 | Berger et al. | 101/91 X |
| 5,237,506 | 8/1993 | Horbal et al. | 364/464.02 |
| 5,276,844 | 1/1994 | Aebi et al. | 395/425 |
| 5,278,541 | 1/1994 | Wicht et al. | 340/636 |
| 5,301,116 | 4/1994 | Grünig | 318/280 |
| 5,339,733 | 8/1994 | Malin | 101/91 |
| 5,340,965 | 8/1994 | Horbal et al. | 235/101 |
| 5,359,273 | 10/1994 | Flückiger | 318/794 |
| 5,363,760 | 11/1994 | Lindenlueller et al. | 101/91 |
| 5,389,863 | 2/1995 | Flückiger | 318/549 |
| 5,467,709 | 11/1995 | Salomor | 101/91 X |

FOREIGN PATENT DOCUMENTS

| | | |
|---|---|---|
| 0062376 | 10/1982 | European Pat. Off. . |
| 0526139 | 2/1993 | European Pat. Off. . |
| 0526140 | 2/1993 | European Pat. Off. . |
| WO89/11134 | 11/1989 | WIPO . |

*Primary Examiner*—Karen Masih
*Attorney, Agent, or Firm*—Oppedahl & Larson

[57] ABSTRACT

A self-contained postage meter does not have a base separable from a main body. The single secure housing contains everything that would be in the main body of a prior art postage meter and everything that would be in a prior art meter base. Despite containing all these things, the single secure housing is small enough and light enough in weight to permit the entire meter to be readily transported to the post office for inspection or resetting. Within the single secure housing are the print rotor with value wheels, all the mechanisms for setting the print wheels, the descending and/or ascending register and associated microprocessor, and all the mechanisms for transport of the mail piece through the meter. Only a handful of controlled elements are required, chiefly a single inexpensive DC motor for franking and value wheel setting and a few electromagnets. Two one-way clutches are used so that rotation of the motor in one direction accomplishes a setting cycle for the value wheels and rotation of the motor in the other direction accomplishes a printing (franking) cycle.

10 Claims, 14 Drawing Sheets

SINGLE-MOTOR SETTING AND PRINTING POSTAGE METER

The invention relates generally to postage meters or franking machines, and relates more specifically to mechanisms to accomplish the setting of print wheels therein and the printing of postage.

BACKGROUND

The designer of a postage meter, also called a franking machine, faces many competing pressures. First and foremost is the requirement that the design of the meter satisfy the postal authorities in the country where the meter is to be used. If a manufacturer has the goal of marketing the meter in not one but several countries, the practical consequence is that the meter has to satisfy all of the postal authorities in all of the countries, or must at least be easily and inexpensively adapted to comply with the requirements in each country. Generally there will be a requirement that critical portions of the meter (for example, the ascending or descending register and the printing mechanism) be contained within a single secure housing. The housing has to be made so that it is easy to detect tampering (and attempted tampering) by visual inspection. The postage impression placed on the mail piece by the meter has to be of a printing technology that is not easily counterfeited, replicated, or altered without detection; this tends to rule out most printing technologies other than the use of formed metal print elements within a rotating print head or rotor. Indeed the vast majority of postage meters in use worldwide have print rotors using metal print elements having raised indicia which receive ink on the raised areas thereof from an ink roller, and the rotor is rotated so that the indicia come into contact with the mail piece to form the postage impression on the mail piece. In this way a relief printing impression is accomplished that is much more difficult to counterfeit than, say, a pin-matrix or ink-jet impression. The indicia include fixed portions such as the country and meter identification as well as variable portions such as the date and postage amount. The variable portions are varied through the use of print wheels that can be rotated so that particular indicia are positioned for printing.

It will be appreciated that the mechanism for the setting of print wheels represents a particularly important aspect of the meter design. To be approved by the postal authorities, the mechanism has to provide a highly reliable linkage between the print wheels and the ascending and/or descending register, so that it is highly likely that any printing of postage will result in an accurate debiting of postage value from the descending register and/or accurate creding of postage value to the ascending register. In a pure mechanical postage meter the linkage is, of course, a mechanical linkage between one or more mechanical registers and the print wheels. In a postage meter having electronic registers the linkage is accomplished by a blend of hardware and software.

To satisfy postal authorities the linkage between the print wheels and the registers must not only be highly reliable over hundreds of thousands of postage impressions, it must also be quite robust against a variety of harms including abuse by users. Where the linkage is based partly in software it is typically required that the software monitor the mechanism so that malfunctions are detected and annunciated.

The linkage between the print wheels and the registers is difficult to design not only because of the above-described regulatory requirements but also because it has to function in the context of a rotating print rotor. The rotor has to be capable of rotating a million times or more in the life of the meter, which emphasizes the fact that the rotor must be freely rotatable relative to the rest of the meter. Somehow the designer must arrive at a way to accomplish the print-wheel linkage across the boundary between the rotor and the rest of the meter. The linkage has to provide its highly reliable function of adjusting print wheels when the rotor is not moving, and yet has to lock the print wheels during times when the rotor is moving.

The patent art is filled with approaches that have been proposed for the linkage between the print wheels and the registers, few of which have been commercially successful. One successful approach is that employed in the F310 postage meter. In that prior art approach, the print rotor has a long axle with an H-shaped cross section. Along the axle and set into recesses of the axle are racks that slide along the axle. Each rack is linked to a respective print wheel in the rotor, so that in a typical rotor with four or five print wheels there will be a corresponding number of racks along the axle. When the rotor is in a "home" position, the racks engage with gears in the main body of the postage meter. When the rotor is out of the home position (generally because a postage printing operation is in progress) the racks are no longer in engagement with the gears in the main body of the postage meter.

What has been described thus far is the linkage from the print wheels to gears in the main body of the postage meter.

Continuing the account of a prior-art way to link the print wheels to the registers, what will now be described is a prior-art way to link the gears in the main body of the postage meter to the registers. But first it is instructive to review some of the constraints on the designer regarding this part of the linkage. The gears have to be under the complete control of the microprocessor, located in the main body of the postage meter, which maintains and updates the registers. The microprocessor has to be able to actuate electrically controllable elements such as motors and electromagnets to bring about any desired position of the print wheels. It has to be able to receive information from electrical sensors such as Hall-effect sensors, LED-phototransistor pairs, or mechanical electric switches, to have highly reliable information about the positions of the print wheels. All of this has to be accomplished in a highly reliable way (to satisfy the postal authorities) so that any of a wide range of failure modes and tampering attempts will be detectable by software so that appropriate action may be taken, such as disabling the meter or at least logging the suspicious event. And it has to be accomplished in a way that continues to work properly after several hundred thousand setting and printing cycles.

Beyond the requirements imposed by the postal authorities are practical requirements. The manner in which the microprocessor controls the gears (that engage the rotor axle racks) cannot be too bulky, the parts count cannot be permitted to be too high, the parts cannot be unduly expensive, and the machine should be easy and fast to assemble. What's more, from the user's point of view the setting has to take place fairly quickly.

Conceptually, one way a microprocessor could control such gears could be as follows. For each gear that needs to be controlled, a stepper motor is provided. The stepper motor is linked in a reliable way to the gear, and a position sensor is also linked in a reliable way to the gear. The sensor could be an encoder, so that its output at all times communicates the absolute position of the gear. With such an arrangement, when the processor wishes to bring about some particular setting of a print wheel, the processor simply reads the output of the encoder, determines whether or not the print wheel is already in the desired position, and drives the stepper motor as needed until the encoder indicates that the print wheel is in the desired position.

Such an arrangement is conceptually simple, but it has numerous drawbacks. Where five print wheels are to be controlled, this arrangement would require five stepper motors, five resolvers, and all the interface electronics attached thereto. Such equipment takes up a lot of space, costs a lot of money, and consumes a lot of power in energizing the motors. Software is also an area of concern. If the software is simple, or if the processor is not very powerful, then it might be necessary to actuate the five stepper motors one after the other. Such serial setting might take too long for the user of the meter. Contrariwise, if the five stepper motors are to be operated simultaneously, then the processor has to be more powerful and the software more difficult to write and test.

Yet another arrangement that some have proposed is the user of, say, two motors. A first motor determines which of the five print wheels is to be set, and a second motor does the setting. In a typical arrangement of this type, the first motor controls a transmission which selectively connects the second motor to one or another of the gears for the print wheels. It is all to easy to make mistakes when designing such a system; for example when one of the gears is being set some attention must be given to fixing the positions of the other gears. But at least one such system set forth in the prior art overlooks this and leaves all the gears (other than the one being set) free to move in response to any user manipulation; it would be all too inviting (to the user who is predisposed to misdoing) to attempt to get more postage than is being paid for by manipulating the print wheels in such a system.

Another potential drawback to such a serial set system is that setting of all of the print wheels might take longer than the user would prefer.

Serial setting has been employed in very large so-called "flatbed" postage meters, used by mailing houses that send out very large volumes of mail. Typically the meter is not brought to the post office for inspection and resetting, but instead the user pays and extra fee for the postal employee to come to the user's location to inspect and reset the meter. Because the meter is not moved very often, its large size and weight are not seen as a great disadvantage by the user. Most users of such meters print a large number of mail pieces for any particular value setting, so the setting of print wheels does not happen very often compared with the number of mail pieces sent through the machine; as a result even though the setting of print wheels may take a relatively long time this is not necessarily seen as a great disadvantage. The user who sends out very large volumes of mail is also unlikely to see high cost as a problem so long as the meter franks the mail quickly and reliably.

In either of the two above-described systems there has to be a way for the microprocessor to sense, with high confidence, the positions of the systems being manipulated. One choice, already mentioned, is the use of position encoders, which provide many-wire signals indicative of the absolute positions being sensed. Another choice is to use much simpler resolvers, which emit simple quadrature signals indicative of relative motion only. Such resolvers are generally used in connection with some sort of absolute indicator such as an end-of-travel switch. The subsystem being controlled (one of the five stepper motors in the five-motor system above, or one of the two motors in the two-motor system above) is caused to move in a direction that will trigger the absolute indicator. From that point onwards, the processor (or some dedicated electronics hardware associated with the resolver) counts pulses from the resolver to keep a running account of the position of the subsystem. It will be appreciated that if such resolvers and end-of-travel switches are used, then it is necessary to run the subsystems to the end-of-travel position from time to time to be sure that everything is in the position that it is supposed to be in; depending on the design of the setting system this may be required during every setting cycle. Such excursions take time and add to the length of time the user has to wait for a setting cycle to finish.

Still another prior-art way for the microprocessor to control the print wheels is set forth in European patent no. 62 376, published Oct. 13, 1982, assigned to the same assignee as that of the present application. As described in that patent, the control of gears, associated with print wheels is accomplished in a way that overcomes many drawbacks of the multiple-motor systems set forth above. The elements controlled by the microprocessor are but a single motor, and several electromagnets, one for each gear. The motor need not be an expensive and difficult-to-control stepper motor but can be an inexpensive DC motor. The sensors monitored by the microprocessor are LED-phototransistor pairs, each coupled to a slotted disk. (Franking is accomplished with the assistance an additional motor, typically an AC motor, located in a base that is separate from the secure housing of the main body of the meter.)

As set forth in that patent, a single shaft carries several clutches. Each clutch is linked by gearing or other mechanical means to one of the print wheels. The single shaft is controlled by the motor. If the motor is rotated in one direction, the result is that all the print wheels are brought to one extreme position such as zero (that is, the position that would print a "zero" on the mail piece) or a defined position below zero. If the motor is rotated in the other direction, the result is that all the print wheels are brought to another extreme position such as nine (the position that would print a "nine" on the mail piece). A sensor linked to the shaft permits the microprocessor to monitor the position of the shaft and the progress of its movement.

The mechanism described thus far is of interest only to the users whose postage printing needs would consist of repeated characters such as "1111" and "2222". As described in the above-referenced European patent no. 62 376, the electromagnets are employed to fix each print wheel when it has reached its desired position. Each electromagnet is associated with one of the print wheels, and has a pawl that, when released, drops into a tooth in the mechanism connecting a clutch to that print wheel. The clutch then "breaks loose", so that the print wheel remains fixed in position by the pawl, even if the axle keeps rotating. The setting cycle is as follows. First the motor is rotated in the direction that brings all the print wheels to their minimum position. All the electromagnets are energized. Then the motor is rotated in the direction that increases the numerical setting of the print wheels. When a particular print wheel has reached its desired position, the electromagnet is de-energized. When the electromagnet is de-energized it releases its pawl, which halts its print wheel.

The way the microprocessor knows when to de-energize a electromagnet is that a sensor linked to the associated print wheel will have emitted signals indicative of the print wheel reaching its desired position.

Eventually all of the print wheels will have reached their desired positions, all of the electromagnets will have been released, and the motor can stop moving. The setting process has been accomplished.

The clutches used in this arrangement have to satisfy several requirements. In the direction that brings the print wheels to their lowest position (the first part of the setting cycle) each clutch has to have a positive engagement that, without fail, returns each print wheel to its lowest position, despite whatever drag may exist due to friction and the like. In the direction that increases the position of the print wheels (the second part of the setting cycle) each clutch has to maintain positive engagement until such time as its associated electromagnet releases and drops its pawl. At the point that the pawl blocks movement of the print wheel, the clutch has to "break away" so that the two parts of the clutch rotate relative to each other and are no longer fixed together. The breakaway must not impose too great an impulse load onto the pawl, or the pawl and the teeth with which it engages could be damaged. After the breakaway has occurred, the clutch cannot impose too great a frictional load on the axle, since the axle has to be able to continue its movement so that other print wheels may be moved to their desired positions.

The arrangement just described, and set forth in European Pat. No. 62 376, offers many advantages over the prior art. It is not very bulky compared to a system with two, four, or five motors, does not consume much power, and is fairly easy for the processor to control. It is much faster to set than most serial setting systems.

But none of the systems discussed heretofore fully satisfies all the competing requirements that face the designer. For example, each of the systems discussed thus far has a paper path through which a mail piece passes; the paper path has numerous moving parts that require a relatively powerful motor for actuation. Generally an AC motor is used. But AC motors are heavy and take up a lot of space. From time to time it is necessary for the main body of the postage meter (the part within the secure housing) to be transported to a post office, for resetting with additional postage value or for a periodic check (in which the meter is examined for signs of tampering). To keep down the weight and size of the main body that is to be transported, some of the parts of the postage meter, such as the large AC motor, are placed in a meter base. The meter base is moved relatively rarely (i.e. when the meter is installed) and the base and the main body of the meter are designed so that the main body is readily removed from the base for the trip to the post office. Thus even if the base is heavy and bulky, this is not too great a problem since it does not have to move very frequently.

But the decision to apportion the moving parts of the meter into a base portion and a removable main body has drawbacks of its own. Dozens of moving parts have to be added to the design to facilitate mechanical linkages that are made and broken when the main body is placed on the base or removed from it. Each place in the main body of the meter where something connects to the base represents a place where someone might try to tamper with the meter to obtain free postage. Thus many additional moving parts have to be added to the design to protect against such tampering. The postage meter prior art is filled with all manner of shutters, interposers, sliding covers, and locks that exist solely to protect against what someone might try to do when the main body of the meter is separated from the meter base. These moving parts contribute to the parts count of the meter, and to its assembly cost and complexity. These moving parts also affect, in a negative way, the reliability of the postage meter. In the face of all these difficulties and drawbacks it might be thought that those working in the postage meter art would long ago have devised ways of making a one-piece meter that is light and small enough to take to the post office, and that also satisfies all the other demands placed on a postage meter to secure regulatory approval. Such is not the case.

SUMMARY OF THE INVENTION

In keeping with the invention, what is shown is a postage meter that is self-contained; it does not have a base separable from a main body. The single secure housing contains everything that would be in the main body of a prior art postage meter and everything that would be in a prior art meter base. Despite containing all these things, the single secure housing is small enough and light enough in weight to permit the entire meter to be readily transported to the post office for inspection or resetting. Within the single secure housing are the print rotor with value wheels, all the mechanisms for setting the print wheels, the accounting register or registers and associated microprocessor, and all the mechanisms for transport of the mail piece through the meter. According to the invention, only a handful of controlled elements are required, chiefly a single inexpensive DC motor for franking and value wheel setting and a few electromagnets. Two one-way clutches are used so that rotation of the motor in one direction accomplishes a setting cycle for the value wheels and rotation of the motor in the other direction accomplishes a printing (franking) cycle. The setting cycle uses a four-bar linkage to rotate a setting axle in one direction and in the other direction. Clutches on the setting axle permit selective transmission of setting movement to the value wheels, mediated by pawls which are controlled by electromagnets. Power consumption is small and the meter is reliable. Despite the relatively low bulk and parts count the design satisfies simultaneously the demands of the postal authorities and the needs of the users.

DESCRIPTION OF THE DRAWING

The invention is described with reference to a drawing in several figures, of which.

DETAILED DESCRIPTION

Figure 1:
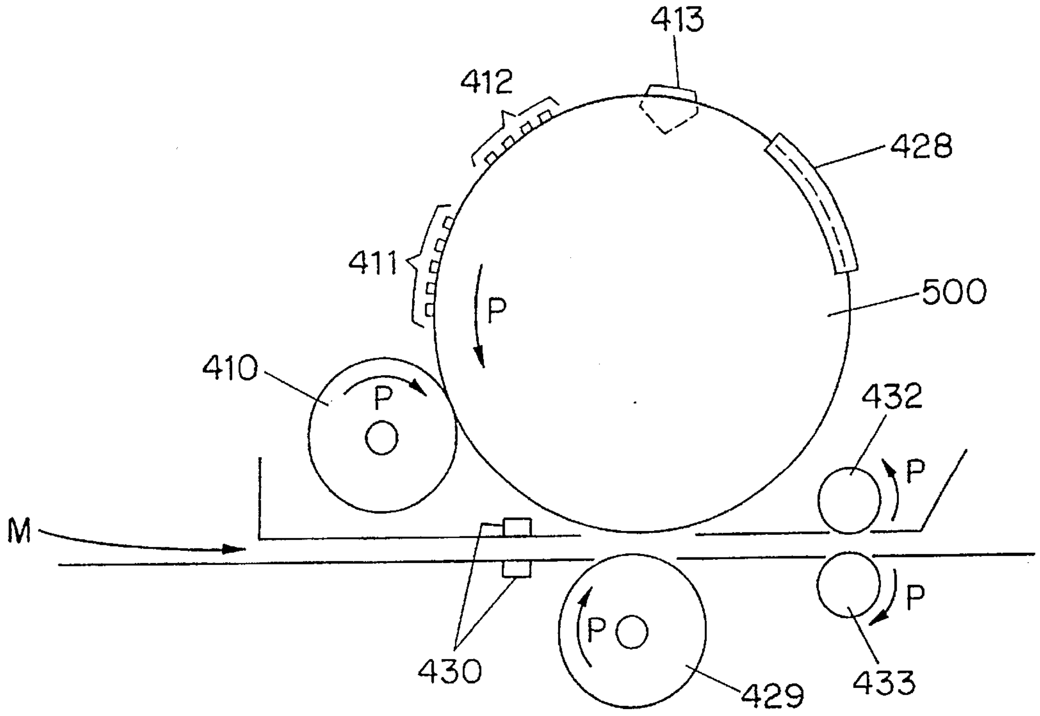
FIG. 1 is a cross section of a postage meter according to the invention.

The postage meter according to the invention is shown in a cross section in FIG. 1. A mail piece enters the postage meter from the left in FIG. 1, along a paper path M directed rightwards in FIG. 1. The arrival of the mail piece in the paper path it sensed by sensor 430, which may be an optical sensor or a mechanical sensing lever actuating an electrical switch. The particular choice of sensor employed forms no part of the invention. When the sensor 430 senses arrival of the mail piece (assuming that the meter is ready to print postage) then the microprocessor 431 (omitted for clarity from FIG. 1) causes a printing or franking cycle to begin. The print rotor 500 is caused to rotate counterclockwise in FIG. 1, as shown by arrow P. Platen 429 is caused to rotate clockwise in FIG. 1, also shown by arrow P. The print rotor 500 may desirably be the rotor set forth in copending application Ser. No. 08/421,900, filed Apr. 14, 1995 entitled Postage Meter with Hollow Rotor Axle, which is incorporated herein by reference. The paper path may be improved in the manner set forth in U.S. application. Ser. No. 08/403,461 filed Mar. 14, 1995, incorporated herein by reference.

As rotor 500 rotates, various relief (raised area) indicia pass by ink roller 410 and come into pressure contact with the mail piece against platen roller 429. Each raised area picks up ink which is then transferred to the paper in a relief fashion. The indicia include postage amount 411, date 412, mail type (class of service or type of sending) 413, and an advertising plate 428. It will be appreciated that depending on the class of service and the country, one or more of the date or mail type may be omitted, and that the ad plate 428 is optional with the user. An optional mechanism, omitted for clarity in FIG. 1, permits the user to raise and lower the date indicia so that a date will or will not be printed.

Ejection rollers 432, 433 are optionally provided which urge the mail piece quickly to the right in FIG. 1 to eject a franked mail piece out of the postage meter and into an optional receiving hopper. A mechanism omitted for clarity in FIG. 1 provides mechanical linkages between the rotor 500, the platen 429, and the ejection rollers 432, 433 so that the rotor 500, which is driven by a motor, omitted for clarity in FIG. 1, drives the ejection roller 433 as needed to move the mail piece through the paper path.

In most prior art postage meters the meter is physically separable into a base containing the platen 429 and ejection roller 433, and a main body comprising a secure housing, containing the print rotor 500, ejection roller 432, and the accounting register or registers. In the meter according to the invention, however, all the items shown in FIG. 1, including the platen 429 and the ejection roller 433, are in the secure housing of the meter. This is possible only because of reductions in size and weight of the meter described further below. Including all the items of FIG. 1 within the secure housing of the meter permits substantial simplification of the linkages between the rotor 500, the platen 429, and the ejection rollers 432, 433, which saves complexity and cost, and improves reliability.

Those skilled in the art will appreciate that in some countries, the register upon which the PTT places great importance is the descending register. In other countries the accounting for postage places greatest importance on the ascending register. Still other countries place importance on both registers. Herein, the general term "register" or "accounting register" will often be used interchangeably with "descending register" to denote the particular register or registers that are considered important in a particular country.

Including all these items within the secure housing also improves meter security from the point of view of postal authorities, as will now be explained. In a prior art rotor-type postage meter, the secure housing only contains the items above the paper path in FIG. 1. The secure housing, also called the main body of the postage meter, is separated from the meter base when the meter is to be taken to the post office for inspection or resetting. The meter base, in such prior art postage meters, contains the items below the paper path in FIG. 1. Those skilled in the art will appreciate that when the main body of the meter is separated from the base, the underside of the print rotor is exposed. If the rotor happens to be in the "home" position shown in FIG. 1 then the exposure of the underside of the rotor is of little concern. But if the rotor happens to have been halted while printing postage (for example due to an inadvertent or intentional loss of electrical power) with the value wheels 411 downwards, it is of concern to the postal authorities that a user might attempt to tamper with the value wheels 411. But in the meter according to the invention, as was just mentioned, everything above and below the paper path, including the platen 429, is in the secure housing. This reduces substantially the opportunity for tampering with the value print wheels 411.

As will be described in great detail below, an important feature of the postage meter according to the invention is that all of the indicia 411, 412, and 413 are completely controllable and settable by the microprocessor 431.

Figure 2:
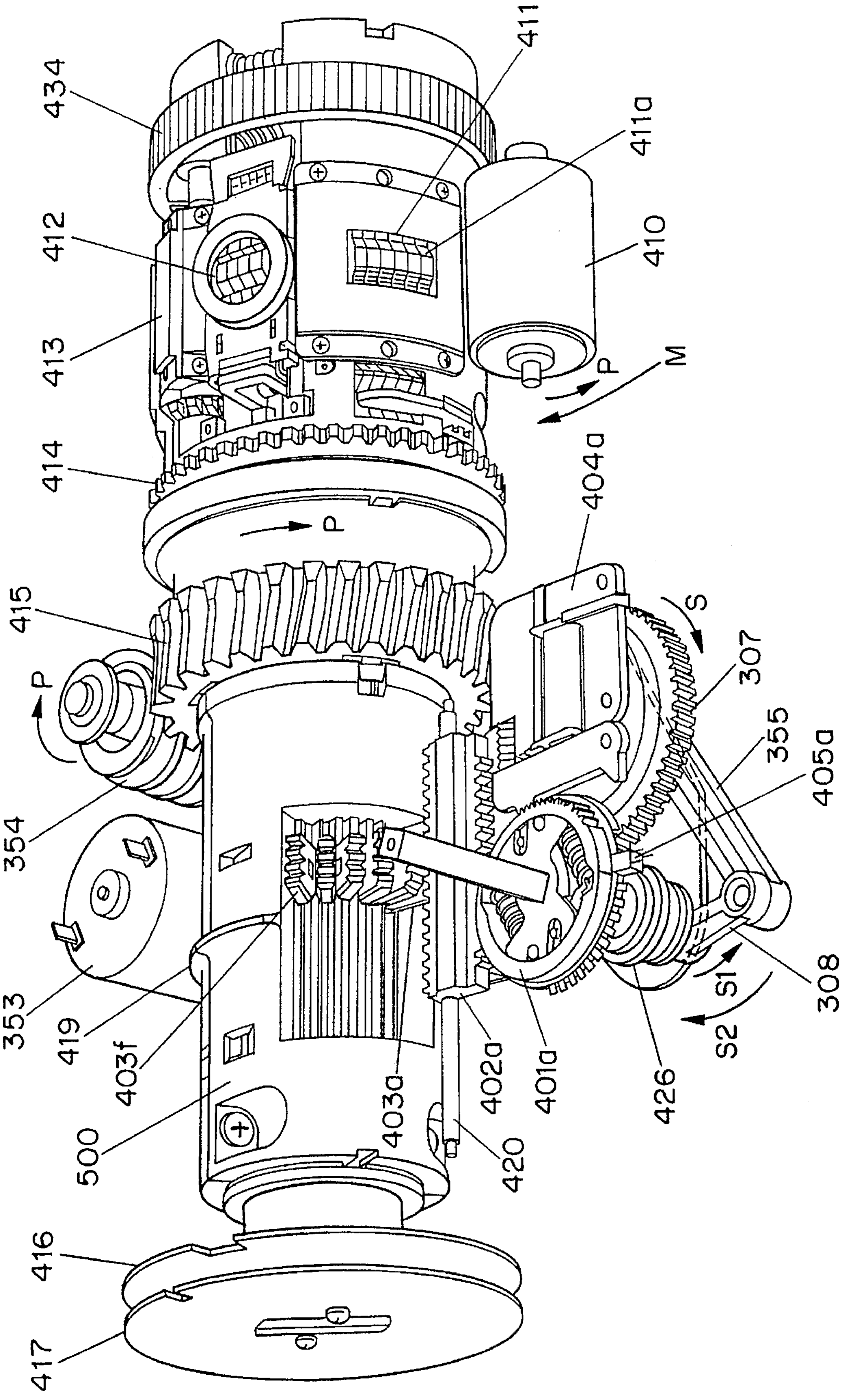
FIG. 2 shows the print rotor in perspective view, surrounded by some of the parts that interact with it.

Turning briefly to FIG. 2, the print rotor 500 is seen in perspective view, surrounded by some of the parts that interact with it. In this view the paper path M appears at the right, directed upwards and to the left. When postage printing (franking) takes place the rotor 500 rotates in the direction shown by the arrow P, with the top of the rotor in FIG. 2 coming toward the viewer and with the bottom of the rotor going away from the viewer. At the same time the ink roller 410 rotates as needed to accommodate the print areas 411, 412, and 413 as they pass by the ink roller 410 on their way to meet the mail piece. As will be shown in more detail below, a helical gear 415 is disposed about the periphery of the rotor 500, and the helical gear 415 is engaged with a worm gear 354. The worm gear 354 is driven (through linkage omitted for clarity in FIG. 2) by motor 353. When the microprocessor 431 (omitted for clarity in FIG. 2) actuates the motor 353 in a particular direction, the result is that worm gear 354 rotates as shown by arrow P, clockwise in FIG. 2. This causes rotation of gear 354 causes the rotor 500 to rotate for printing of postage. Timing disks 416, 417 have slots that are optically engaged with sensors, omitted for clarity in FIG. 2, which permit the microprocessor 431 to monitor the position of the rotor 500 in the printing cycle. Optionally, rotor movement may be sensed using the arrangement set forth in U.S. patent application Ser. No. 08/014,658, now U.S. Pat. No. 5,389,863, assigned to the same assignee as the present application, and incorporated herein by reference. Axial and journal bearings of conventional design hold the rotor 500 in position relative to the rest of the postage meter, confining it axially and translationally so that its only possible movement is rotation about its axis.

A knurled, ridged, or rough region 434 is provided on the rotor 500 to assist in drawing the mail piece along its paper path. A gear 414 provides driving force from the rotor 500 to moving parts below the paper path (e.g. rollers 429 and 433 in FIG. 1) during a printing cycle.

Figure 3:
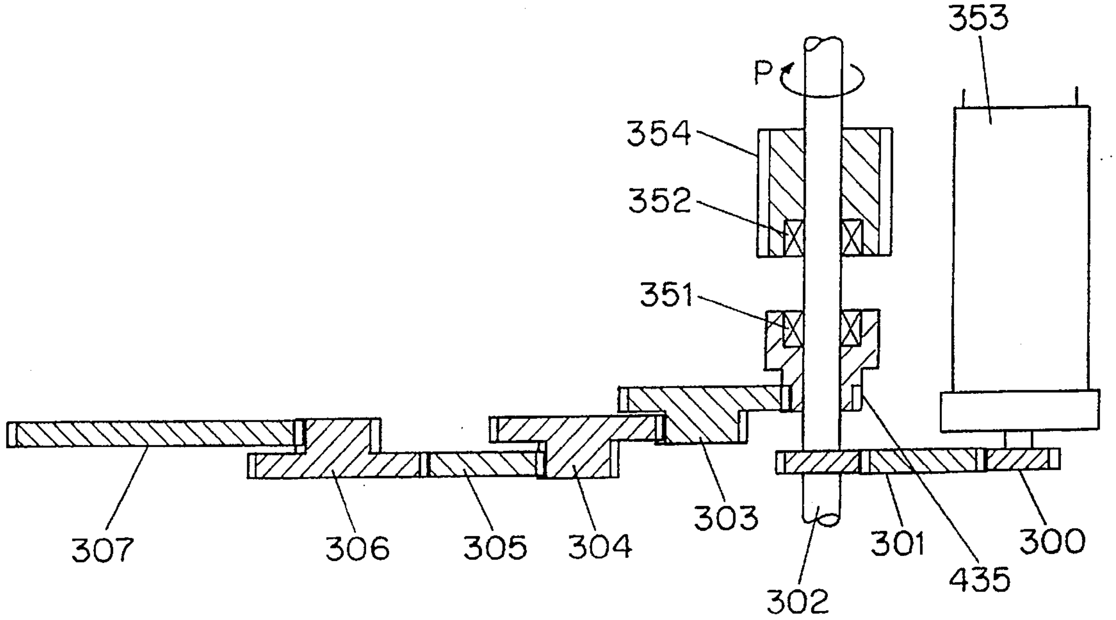
FIG. 3 shows in rearranged section view some of the gears of the postage meter as well as the motor.

One aspect of the postage meter according to the invention that reduces size and weight of the meter is the use of a single motor 353 to drive all meter movements including the printing of postage (franking) as well as the setting of the many print indicia. As shown in FIG. 3, the motor 353 is a DC motor driveable in either of two directions. A planetary reduction gear assembly of conventional design is optionally contained within the motor 353 and omitted for clarity in FIG. 3. The reduced speed output of the motor 353 is available at gear 300. This gear is intentionally selected to be an angled gear to reduce noise. The rotation is passed by idler gear 301 to shaft 302, on which are mounted opposed one-way clutches 351, 352.

Rotation in one direction (shown by the arrow P in FIG. 3) seizes clutch 352 so that worm gear 354 rotates; clutch 351 is free-wheeling during such rotation. Such rotation brings about a printing (franking) cycle as described above, through angular motion of the rotor 500.

Rotation in the other direction (against the arrow P in FIG. 3) seizes clutch 351 so that gear 435 rotates; clutch 352 is free-wheeling during such rotation. Such rotation brings about a setting cycle as will be described below. Reduction gears 303, 304, and 306, together with idler 305, bring about a rotation of crank gear 307.

There is, of course, some nonzero level of friction in each clutch 351, 352 when it is free-wheeling. Thus, it might be thought that during a printing cycle the gears 303 through 307 might be drawn backwards due to friction in clutch 351. Likewise, it might be thought that during a setting cycle the gears 354 and 415 (see FIG. 2) might be drawn backwards due to friction in clutch 352. However, the extreme mechanical advantage in each of the gear trains 303–307 and 354/415 together with the nonzero friction in each gear train ensures that no backwards movement at all takes place in either gear train when the other is being operated. Stated differently, the print linkage does not go backwards at all during setting, and the setting linkage does not go backwards very much if at all during printing.

Figure 4A:
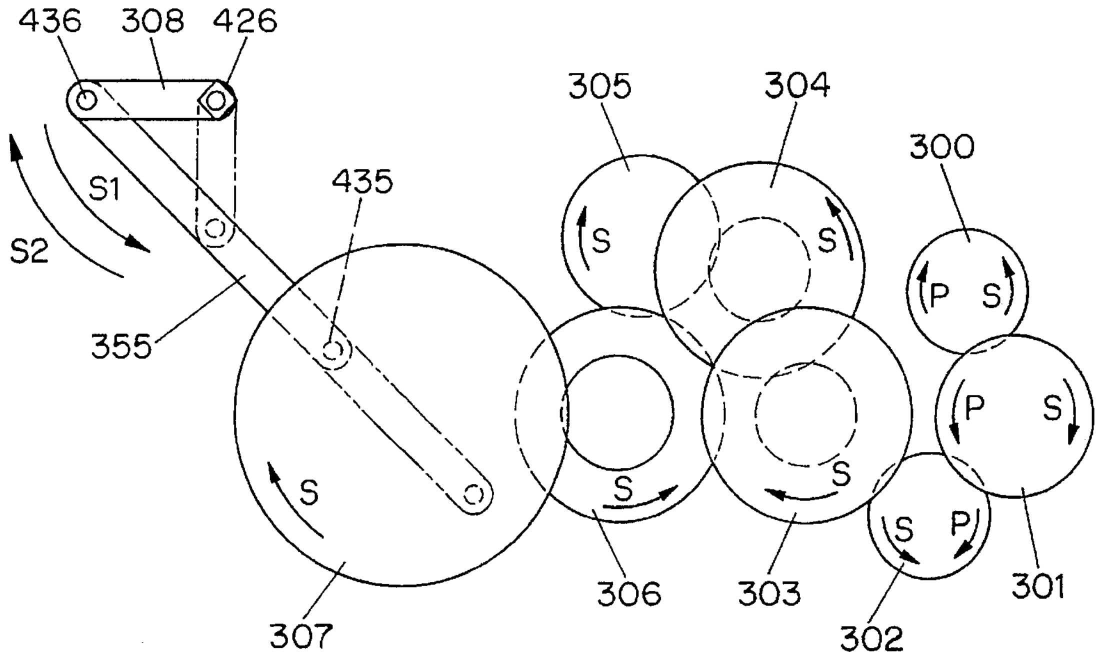
FIG. 4A shows the gears of FIG. 3 in a plan view taken in the plane of the gears.
Figure 4B:
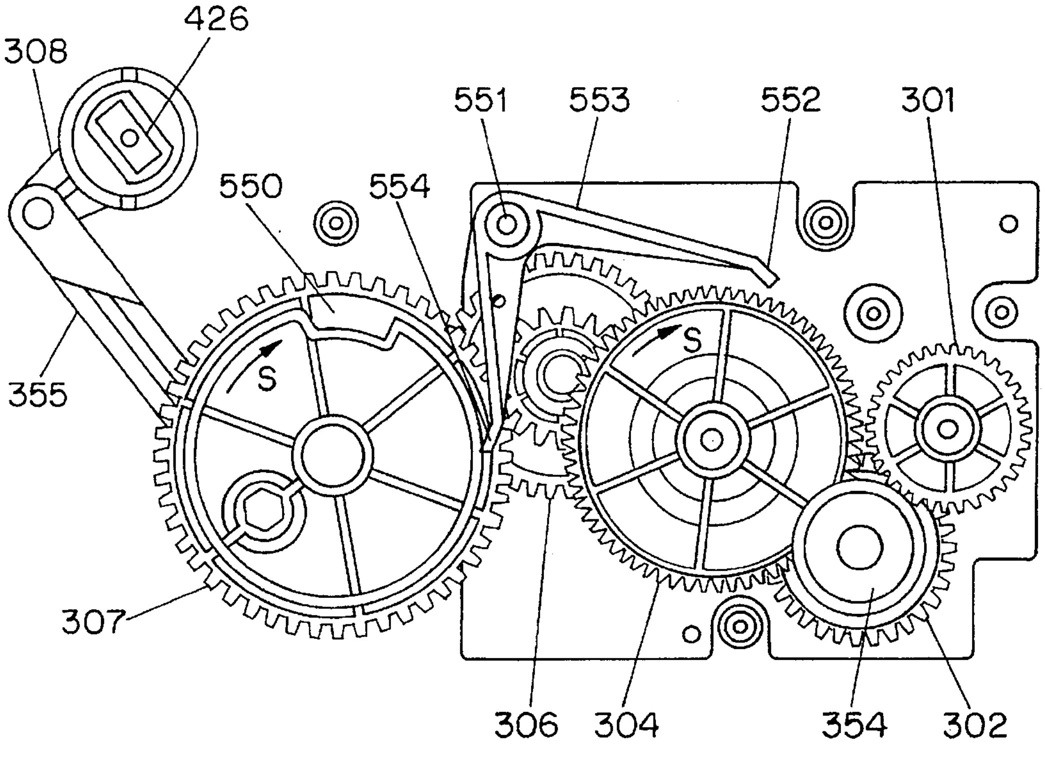
FIG. 4B shows the gears of FIG. 4A in a different embodiment of the invention.

Turning briefly to FIG. 4B, what is shown is an exemplary embodiment of the invention including a ratchet 553. The purpose of the ratchet 553 is to eliminate backwards movement of the setting linkage during printing ratchet 553 is urged by a spring, omitted for clarity in FIG. 4B, in a clockwise direction. FIG. 4B shows the gear train during a setting cycle. During the setting cycle the relieved cam area 550 is not aligned with the cam follower end 554 of the ratchet 553. As a result, cam follower 554 is forced away from the center of gear 307, which rotates the ratchet 553 slightly counterclockwise. As a further result, the pawl end 552 is held at some distance from the teeth of the gear 304.

When the setting cycle is complete, the relieved cam area 550 is aligned with the cam follower 554. This permits ratchet 553 to have its fullest clockwise rotation as urged by its spring. This permits pawl 552 to drag on the teeth of the gear 304. As a result, when printing occurs, which might tend to cause gear 304 to turn counterclockwise, then the pawl 552 blocks such movement. This eliminates backlash in the setting linkage during printing. FIG. 3 shows the gears 300 through 307 as if laid out in a line; in reality the gears are disposed in a compact arrangement as shown in the cross section view of FIG. 4A, taken in the plane of the gears. Gear 300 may again be seen, driven in direction P during printing and in direction S during setting. Idler 301 transmits the rotation to shaft 302. It will be appreciated that shaft 302 carries the clutches 351 and 352 and the worm gear 354, all omitted for clarity in FIG. 4A. If the rotation of shaft 302 is in the direction S, then rotation is conveyed (via one-way clutch 351) to reduction gear 303, and thence to reduction gear 304, idler 305, and reduction gear 306. Rotation of reduction gear 306 causes rotation of crank gear 307 in the direction S.

Because of the one-way clutch 351, crank gear 307 either moves in the direction S (clockwise in FIG. 4A) or moves not at all. It never moves against the direction S (counterclockwise in FIG. 4A). Because of the manner in which microprocessor 431 (not shown in FIG. 4A) is programmed, microprocessor 431 actuates motor 353 so as to bring about integral revolutions of crank gear 307; in general the crank gear 307 never rests in any position other than the home position shown in FIG. 4A. One complete revolution of crank gear 307, which defines a single setting cycle, brings about the movement of the arm 308 counterclockwise as shown with arrow S1, and then brings about movement of the arm 308 clockwise as shown with arrow S2.

Figure 5A:
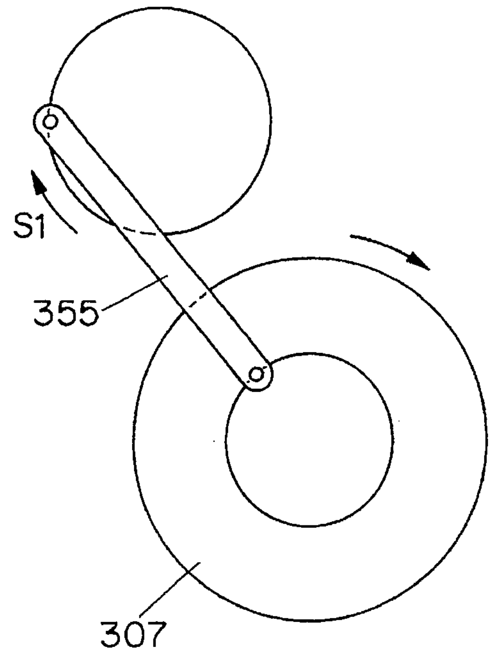
FIGS. 5A, 5B, 5C and 5D show the geometry of the "four-bar" linkage at four different times.

As shown in FIGS. 5A, 5B, 5C and 5D, the geometry of the pivot point 435, the link 355, and the arm 308 are selected so that the range of motion of the arm 308 is about 99°, or slightly more than one-fourth of a circle. This defines a "four-bar" linkage. Arm 308 is fixed to nonround axle 426, so that axle 426 goes through the identical 99° excursion counterclockwise and then clockwise in FIG. 4A. FIG. 5A shows the home or at-rest position of the crank gear 307. Link 355 is at the extreme of its movement in the direction that is upwards and to the left in FIG 5A. Axle 426, omitted for clarity in FIG. 5A, is in its extreme clockwise position in FIG. 5A.

Figure 5B:
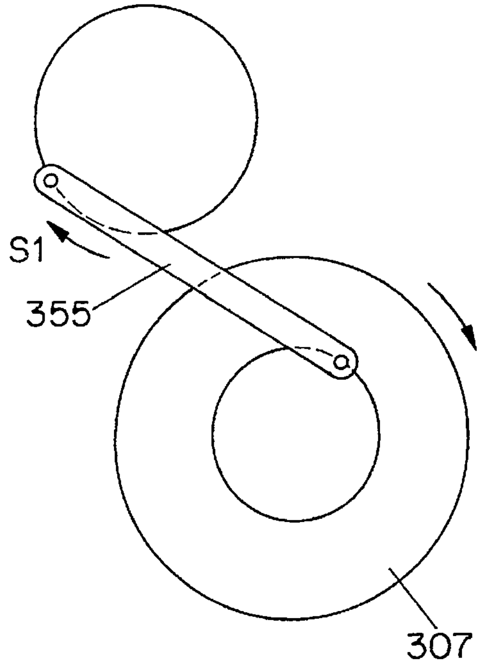

Approximately one-fourth of the way through a setting cycle, the crank gear 307 has reached the position shown in FIG. 5B. Link 355 has moved downward and to the right in FIG. 5B, shown by arrow S1.

Figure 5C:
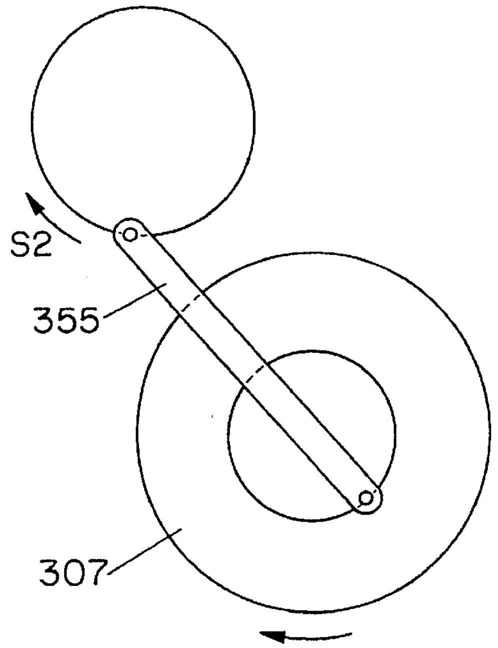

Approximately one-half of the way through a setting cycle, the crank gear 307 has reached the position shown in FIG. 5C. Link 355 has reached the extreme of its movement in the direction that is downwards and to the right in FIG. 5C. Axle 426, omitted for clarity in FIG. 5C, is in its extreme counterclockwise position in FIG. 5C.

Figure 5D:
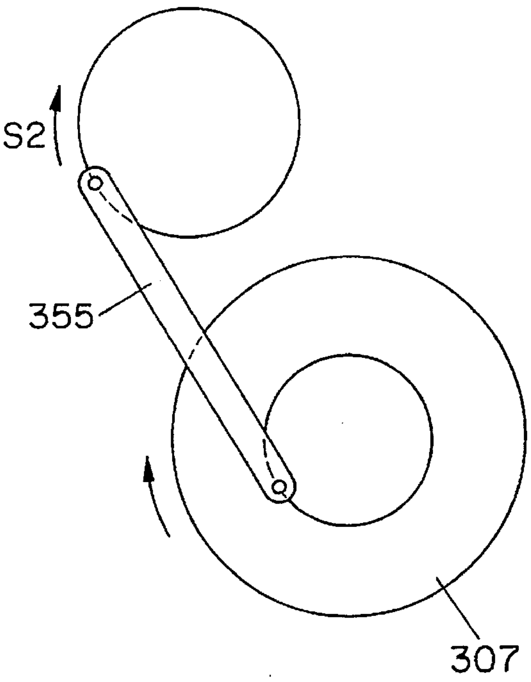

Approximately three-fourths of the way through a setting cycle, the crank gear 307 has reached the position shown in FIG. 5D. Link 355 has moved upward and to the left in FIG. 5D, shown by arrow S2.

At the completion of a setting cycle the crank gear 307 has reached the position shown in FIG. 5A. During the setting cycle, the crank gear 307 has moved uninterruptedly in a clockwise direction, while the axle 426 has moved first counterclockwise about 99° and then clockwise about 99°.

It is now instructive to return to FIG. 2, where crank gear 307 may be seen, rotation of which is in direction S as shown. Link 355 and arm 308 are visible, and the motion of arm 308 in the first half of a setting cycle (S1) and the second half (S2) are shown. Nonround axle 426 is also visible. During a setting cycle, axle 426 rotates first counterclockwise, then clockwise. Breakaway clutch 401*a*, about which more will be said later, rotates first counterclockwise, then clockwise. Rack follower 402*a* slides first to the left, then to the right, along fixed rod 420*a*. Rack teeth 403*a* slide first to the left, then to the right. Inside the rotor 500 a rack 425*a*, omitted for clarity in FIG. 2, is fixed to the rack teeth 403*a* and slides to the left and then to the right. A corresponding value print wheel 411*a*, engaged to the rack 425*a*, rotates one way, then the other, as described in more detail below. Racks 425 and related moving parts may be made more secure by means of techniques set forth in copending application Ser. No. 08/400,335, filed Mar. 7, 1995, which is incorporated herein by reference.

The value print wheel 411*a* is fixed in a desired position by the microprocessor 431 by releasing electromagnet 404*a* at a particular time (during the second half of the setting cycle, as discussed in more detail below), so that the breakaway clutch 401*a* breaks away. The value print wheel 411*a* remains fixed despite continued movement of the axle 426.

If a printing cycle follows, then the print rotor 500 rotates as shown by the arrow P. Rack teeth 403*a* rotate out of engagement with rack follower 402*a*, and the rack teeth 403*b*, 403*c*, 403*d*, 403*e*, and 403*f* each come briefly into engagement with rack follower 402*a*. After the completion of a print cycle, the rack teeth 403*a* come again into engagement with rack follower 402*a* .

Figure 6:
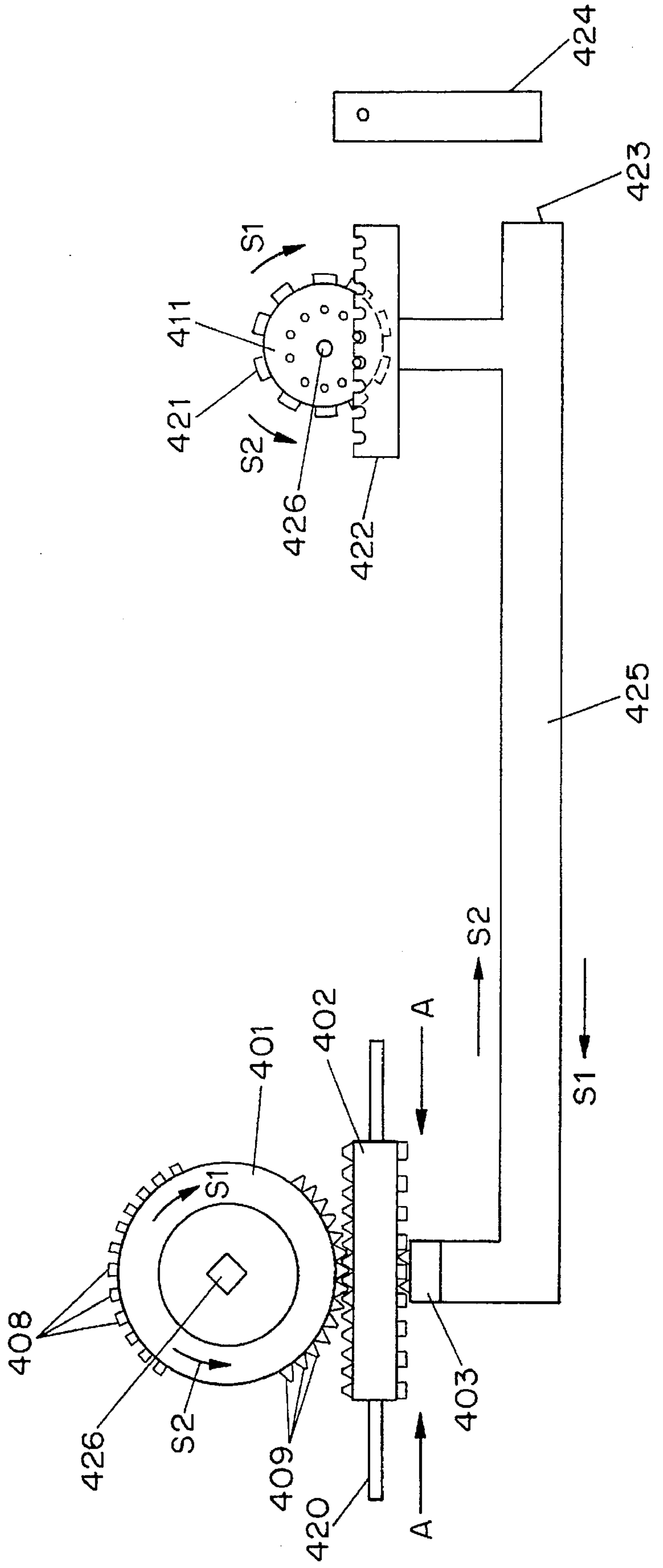
FIG. 6 is a stylized cross section view showing all the moving parts relating to one value print wheel.

The setting activity with respect to a particular one of the value print wheels is shown in complete detail in the stylized cross section view of FIG. 6. In FIG. 6 all the moving parts relating to one value print wheel are shown as if in a single plane, viewed from the bottom of the postage meter. During a setting cycle shaft 426 rotates clockwise, then counterclockwise in this view. Breakaway clutch 401 does likewise. Rack follower 402 moves to the left, then to the right. Rack 425, which is rigidly fixed to rack follower 402, does likewise. Cog rack 422, which is rigidly fixed to or integrally formed with rack 425, does likewise. Value wheel 411 has ten indicia 421 thereon, capable of printing Arabic digits 0 through 9. Value wheel 411 rotates about a shaft 426. Cogs in the face of value wheel 411 engage with the cog teeth of cog rack 422. Thus the rotation of value wheel 411 is first clockwise, then counterclockwise.

The arrangement of the indicia 421 is theoretically arbitrary, but it is desirable (for reasons that will be clearer when the pawls 406 are discussed) that they be arranged so that movement of rack 425 to the right in FIG. 6 leads to the progression 0, 1, 2, . . . 9 in the value wheel 411.

It will be appreciated that each rack 425 slides parallel to the axis of the rotor 500, and that the racks 425 are slidably held within the rotor and rotate with it when it rotates.

One of the features of rack 425 is a surface 423 which, when the rack 425 moves to its rightmost extent in FIG. 6, engages and deflects lever 424. Lever 424 increments a position of one of the date print wheels as discussed elsewhere. Surface 423 is preferably at the rightmost end of rack 425, but could be placed elsewhere on rack 425 if desired, with corresponding relocation of lever 424.

Light barriers 408 are provided on breakaway clutch 401, spaced so that they correspond in a direct way with the print faces (indicia 421) of the value print wheel 411. Preferably the correspondence is one-to-one, but those skilled in the art will appreciate that the correspondence could be otherwise and changes could be made to the programming of the microprocessor to bring about the same inventive results without departing in any way from the invention.

Figure 7:
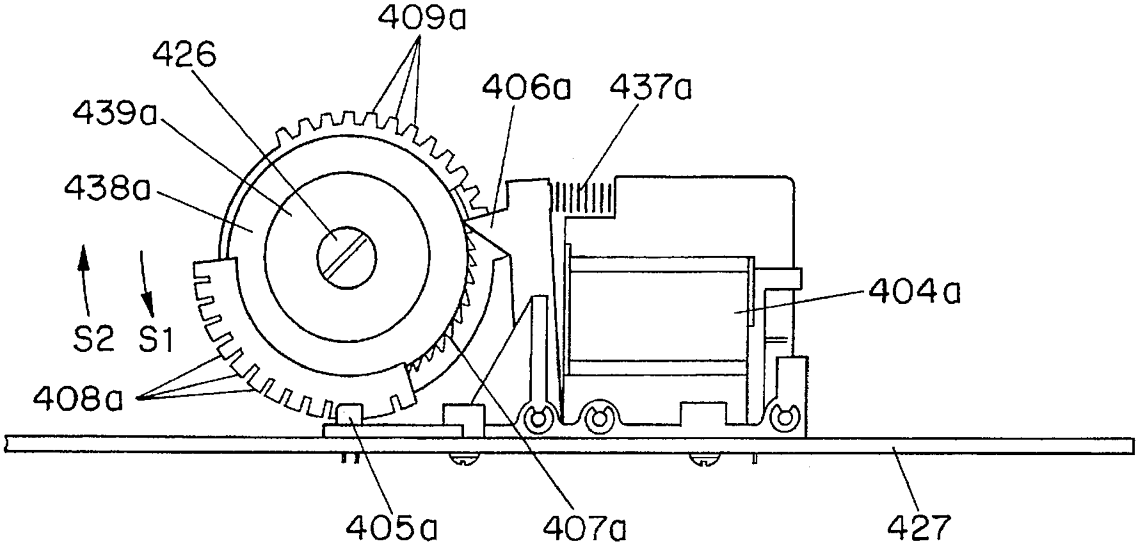
FIG. 7 shows in plan view the pawl and electromagnet arrangement for one of the breakaway clutches.

Turning now to FIG. 7, the pawl and electromagnet arrangement are described in detail for one of the breakaway clutches 401*a*, shown in a cross section view from above the meter. Breakaway clutch 401 is composed of an inner part 439*a* and an outer part 438*a* which sometimes move together and sometimes do not, as described in detail below.

During the first half of a setting cycle (shown by arrow S1) the axle 426 moves counterclockwise. During the first half of the print cycle the electromagnet 404*a* is energized by the microprocessor. This pulls pawl 406*a* against spring 437*a*, and out of engagement with the ratchet teeth 407*a*. The bevels on the bottom of the pawl 406*a*(as shown in FIG. 7) and the top of the ratchet teeth 407*a*(again as shown in FIG. 7) help urge the pawl 406*a* rightwards and out of engagement.

The above-mentioned counterclockwise rotation of the axle 426 causes inner part 439*a* to rotate counterclockwise. At some point during the rotation of inner part 439*a* it comes into an angular relationship with outer part 438*a*, and the two parts "snap" together. The two parts move as one through the remainder of the first half of the setting cycle. By the end of the first half of the setting cycle (FIG. 5C) the value wheel 411*a* (see FIG. 6) will have been rotated into a predefined "home" position, which is preferably below zero in terms of the print indicium that is in position for printing.

The second half of the setting cycle then begins, with movement of the axle 426 in the clockwise direction. The two parts 439*a* and 438*a* move as one with the axle 426 and the barriers 408*a* permit the microprocessor 431 to monitor the movement of the outer part 438*a*. (As will be appreciated from FIG. 6, the robust linkage between the clutch 401 and the value wheel 411 means that the barriers 408 provide highly dependable information to the microprocessor 431 regarding the position of the value wheel 411.) The microprocessor monitors the barriers 408*a* with the light-emitting-diode-phototransistor pair 405*a*. The microprocessor 431 de-energizes the electromagnet 404*a* at an auspicious moment, and the pawl 406*a* drops into the ratchet teeth 407*a*. This halts rotation of the outer part 438*a*.

Desirably the processor polls the sensors 405 quite frequently during the second half of the setting cycle, collecting some 500 to 600 data points. The software can then analyze the data points after the setting activity has ceased, and can determine with high confidence what setting activity was accomplished. The software does a sensor debounce and counts the number of times each clock signal rises and/or falls.

The motor 353 is a powerful one, and its rotation enjoys a manifold mechanical advantage through its planetary gears and through the gears 303–307 (FIGS. 3 and 4). Were it not for the breakaway clutch described in detail below, the consequence of the pawl 406*a* dropping into the ratchet teeth 407*a* would be quite simple—the teeth would be destroyed or the pawl would be destroyed. But because of the breakaway clutch, pawl 406*a* brings the teeth 407*a* to a halt, and brings the outer part 438*a* of the clutch to a halt. The practical result is that a particular indicium 421 (see FIG. 6) will have been neatly centered for printing.

As will be described further below, there is an electromagnet 404 for each of the racks 425 (see FIG. 6). Thus, the microprocessor releases the several electromagnets one by one, at auspicious times, and the result is that each print wheel 411 is in its desired position for printing. (Date setting and setting the mail type die 413 are discussed below.)

Those skilled in the art immediately appreciate that the electromagnet 404*a* must not be deenergized too soon or too late. Either extreme leads to the setting of a print wheel 411 to a position other than the desired position. Several factors influence when to de-energize the electromagnet. From the time the microprocessor cuts off power to the electromagnet there is some nonzero time before the magnetic field drops to zero. (That time is partly a function of the inductance of the electromagnet and partly a function of the persistence or remanence of the core pieces channeling the magnetic field to the moving pawl.) When the magnetic field drops to zero it takes a while for the pawl 406*a* to move into engagement with the ratchet teeth 407*a*. (That time is partly a function of the moment of inertia of the pawl 406*a* about its pivot, and the torque imposed on it by the spring 437*a*.) The time delay is shown on the time line of FIG. 13 as delay 505.

If a mis-setting occurs it is not, however, catastrophic. It does not lead to the user obtaining more postage than the amount debited from the descending register, for example. The reason it is not catastrophic is that the barriers 408*a* permit the microprocessor to detect movement of the outer part 438*a* beyond the desired or expected position. If the outer part 438*a* has moved too far (so that postage would be printed in too large an amount) the microprocessor simply performs another entire setting cycle. Similarly, if the pawl drops too soon this is also detectable. If need be, the microprocessor can optionally keep historical information about such occurrences and take that into account when determining when to de-energize the electromagnet. If the historical information has a disturbing trend, the user can be advised to take the meter in for service. This would be the case if the pawl 406*a* is sticky on its pivot, for example, if one of the ratchet teeth 407*a* has broken off or worn down, or if the spring 437*a* has broken.

As shown in FIG. 7, preferably the electromagnets 404 and the sensors 405 are all soldered to a printed wiring board (printed circuit board) 427. This simplifies assembly of the meter.

Figure 8A:
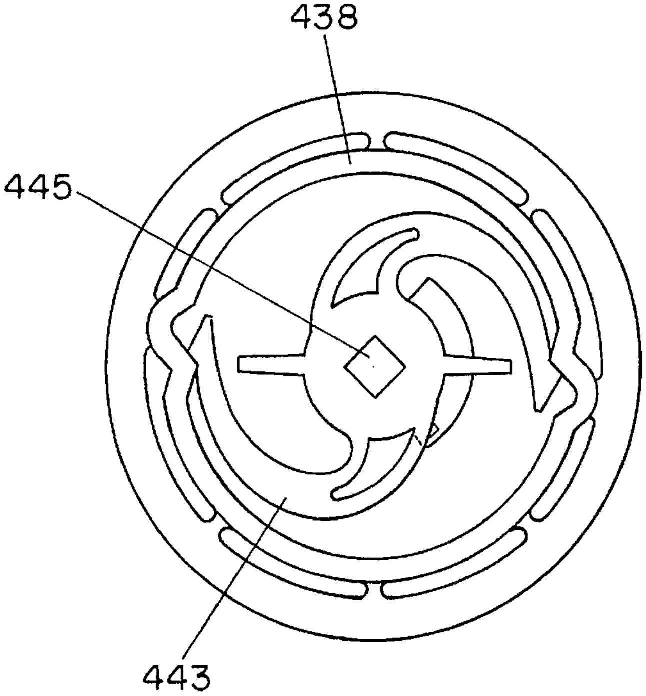
FIG. 8A shows an alternative embodiment for the breakaway clutch.
Figure 8:
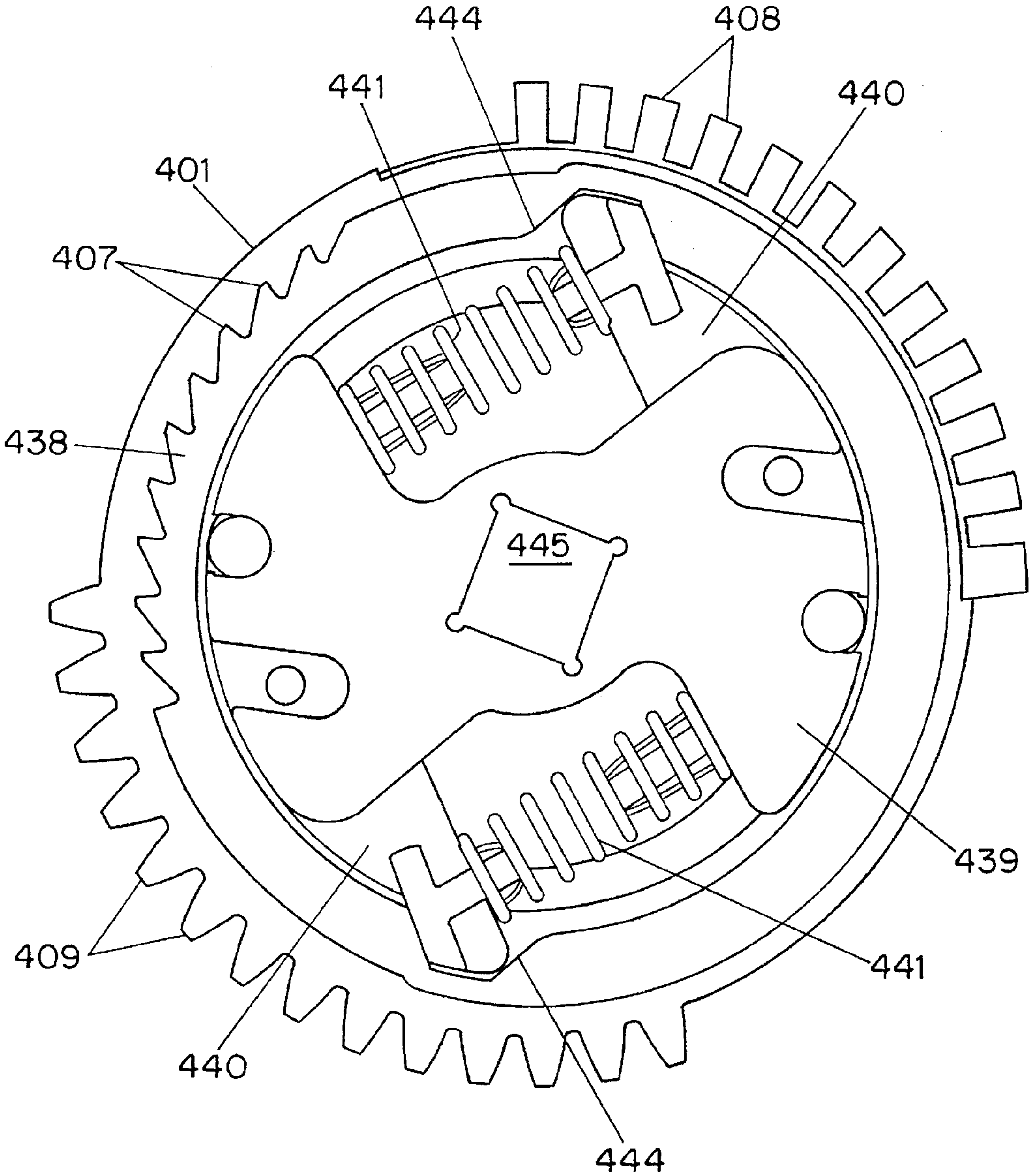
FIG. 8 shows in plan view the preferred embodiment of the breakaway clutch.

FIG. 8 shows the preferred embodiment of the breakaway clutch 401. The outer part 438 has a cylindrical cavity with cutouts 444. The inner part 438 has a body 442 with a hole 445 to mate with nonround axle 426. (In the preferred case where axle 426 is square, then hole 445 is square.) Pawls 440 are pivoted to body 442, and each is urged outward by corresponding spring 441. The spring 441, when compressed as shown in FIG. 8, exerts a force of about 11.5 Newtons; the travel of the pawl is about 1 mm. The body 442, pawls 440, and outer part 438 are all preferably made of strong plastic such as high density nylon. The pawls 440 can be Delrin 100, and the outer part 438 and inner part 439 can be Delrin 500P. FIG. 8 also shows the light barriers 408, the ratchet teeth 407, and the gear teeth 409 about the periphery of the clutch. Each of the just-mentioned three features takes up between one-eighth and one-half of the circumference, and preferably just over one-fourth of the circumference, as shown.

Those skilled in the art can devise other breakaway clutch arrangements which differ from that shown in FIG. 8 but which depart in no way from the invention. For example, the breakaway clutch of FIG. 2 of the above-mentioned European Pat. No. 62 376 could be used. Alternatively, with appropriate selection of materials the inner part 439 of the clutch could be a one-piece flexible member 443, as shown in FIG. 8A, providing the function of the above-mentioned items 440, 441, and 442. In this instance what would be provided is a clutch comprising a one-piece inner part and an outer part, the outer part having at least two concavities facing radially inward, and the inner part having arms corresponding in number to the concavities, each arm dimensioned to be in tension with the inner face of the outer part, and shaped to engage with its corresponding concavity more easily in one direction of relative rotation than the other. The inner part has a non-round hole in its center. In an exemplary embodiment the inner part has two arms, as shown in FIG. 8A. In other embodiments the inner part has three or four or more arms, and importantly the arms are at regular angular spacing, i.e. the spacing between adjacent arms is $2\pi/N$ where N is the number of arms. This offers a small parts count and a simple assembly.

Stated differently, what has been described is a breakaway clutch comprising a first part 439 and a second part 438. The first part 439 is shaped to receive a non-round axle 426 rotating on an axis, and it rotates fixedly with the axle 426 about its axis. The second part 438 is shaped to rotate in relation to the first part 439 and to the axle 426, about the axis of the axle. Formed in the second part 438 are rack teeth 409 (FIG. 6) shaped to engage with a rack follower 402 (FIG. 6). The rack teeth are disposed about a portion of the periphery of the clutch, the rack teeth portion comprising more than one-eighth and less than one-half the periphery. Preferably the rack teeth comprise slightly over one-fourth of the periphery. Also formed in the second part 438 are ratchet teeth 407 shaped to engage with a pawl 406. The ratchet teeth 407 are disposed about a portion of the periphery of the clutch, the ratchet teeth portion comprising more than one-eighth and less than one-half the periphery. Preferably the ratchet teeth comprising slightly over one-fourth of the periphery. Also formed in the second part 438 are light barriers 408 shaped to engage with a light-emitting diode and phototransistor 405. The barriers are disposed about a portion of the periphery of the clutch 401, the barrier portion comprising more than one-eighth and less than one-half the periphery. Preferably the light barriers comprise slightly over one-fourth of the periphery.

In the above-described clutch, a predetermined angular relation between the first part 439 and second part 438 defines a home position relative to each other. The clutch 401 may be said to have breakaway means disposed between the first and second parts. When the first and second parts are in the home position relative to each other, rotation of the first part 439 in a first direction (the direction of the second half of the setting cycle) causes corresponding rotation of the second part 438 in the first direction in the absence of blockage of movement of the second part 438 (e.g. by the pawl 406). In the presence of blockage of movement of the second part 438, the first part 439 breaks away therefrom and is capable of continued movement unimpeded (except by a modest level of friction) by the motionless part 438. When the first and second parts are in the home position relative to each other, rotation of the first part 439 in a second direction (the first half of the setting cycle) causes corresponding rotation of the second part in the second direction.

What is provided is not just one clutch but a clutch stack. The clutch stack comprises a non-round axle 426 rotating on an axis and a plurality of breakaway clutches 401 stacked on the axle, each breakaway clutch 401 comprising a first part 439 and a second part 438. The clutches are as described above. The clutch stack may also be thought of as including the plurality of electromagnets 404 corresponding to the clutches 401. Each electromagnet comprises a pawl 406 movable between a first position in which the pawl engages its corresponding ratchet teeth 407 (the deenergized position), and a second position (the deenergized position) in which the pawl is out of engagement with the ratchet teeth. Each electromagnet preferably has a spring urging its pawl toward the ratchet teeth. The clutch stack may also be though of as including the plurality of light-emitting-diode-phototransistor pairs 405 corresponding to the clutches 401, with each sensor 305 positioned to engage the light barriers 408. The clutch stack may also be thought of as including a printed wiring board 427 disposed parallel to the axle 426, to which are soldered the plurality of light-emitting-diode-phototransistor pairs 405 and the plurality of electromagnets 404.

Figure 9A:
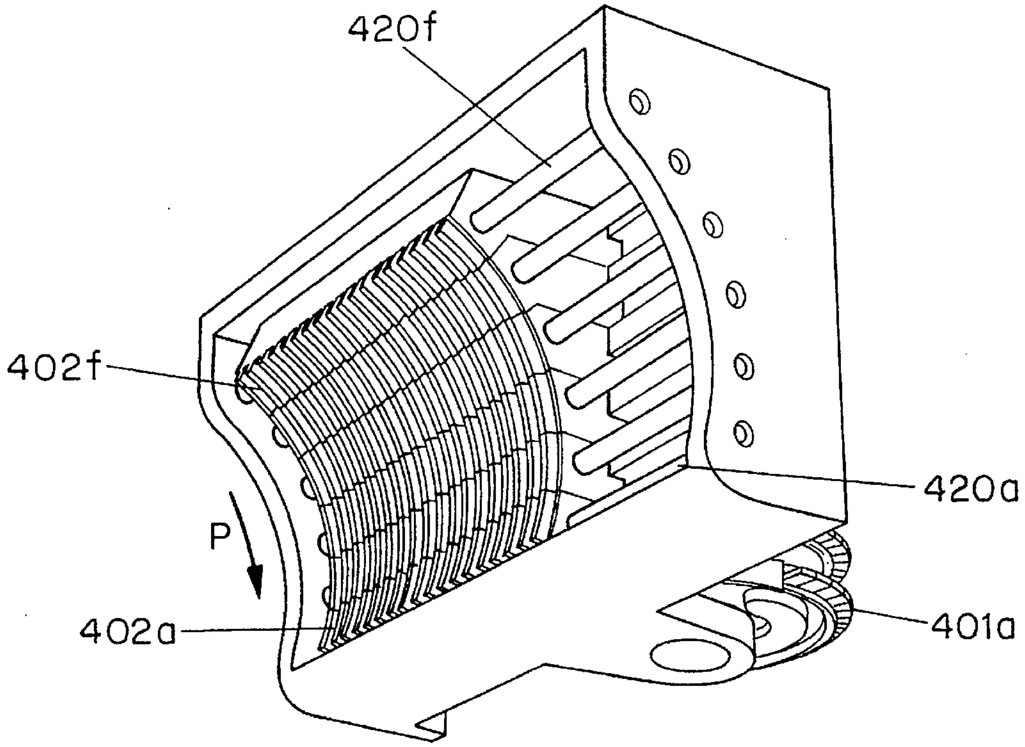
FIGS. 9A and 9B are perspective views of the clutch stack and FIG. 9C is a cruss section view of the clutch stack.
Figure 9B:
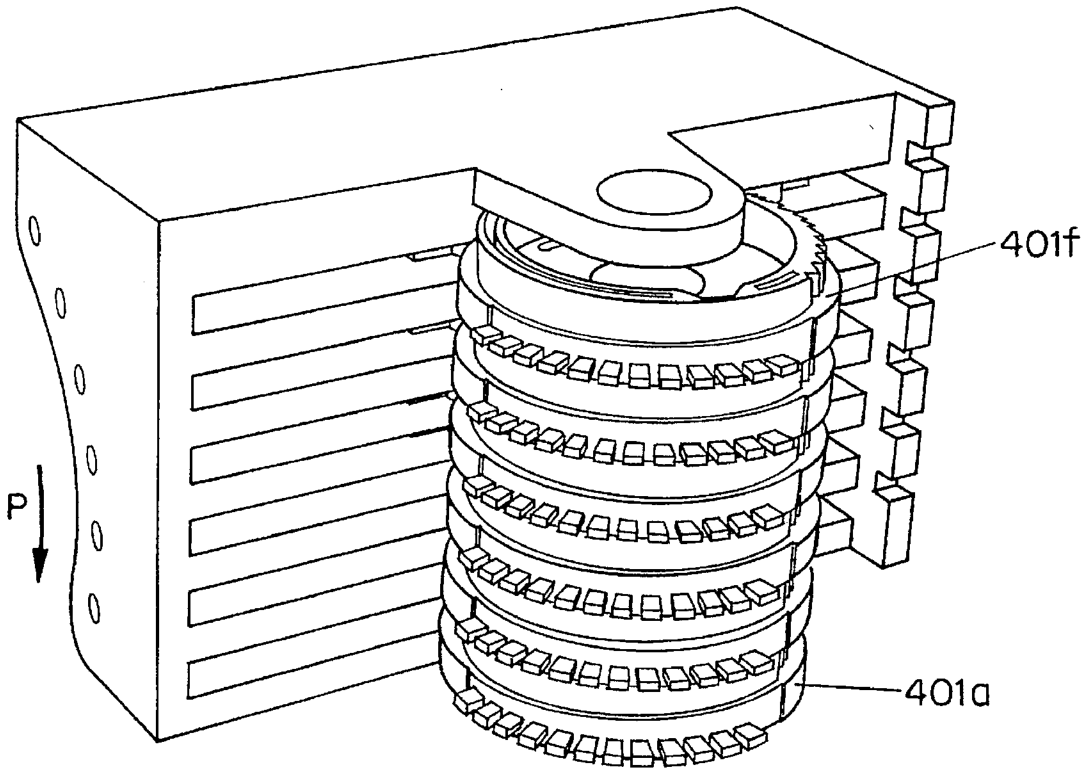

Returning now to FIG. 2, it will be appreciated that what has been illustrated and described thus far is the setting of one particular print indicium of the print rotor 500. FIG. 2 shows one breakaway clutch 401*a*, for example, the other breakaway clutches having been omitted for clarity in FIG. 2. FIG. 9B is a perspective view of part of the meter showing the breakaway clutches 401*a* . . . 401*f* in their vertical stack. The same stack is seen in a different view in FIG. 9A, where rack followers 402*a* . . . 402*f* may be seen, each sliding on corresponding rods 420*a* . . . 420*f*. This sliding is parallel to the axis of the rotor 500. It will be noted that the clutches 401 are stacked in a line, on axle 426 (omitted for clarity from FIG. 9B), while the rack teeth 403*a* . . . 403*f* are disposed along a section of a circle, namely a portion of the circumference of the rotor 500. The interface between the rotor, which rotates, and the rest of the meter, which does not, is along the curved arc presented by the teeth of the rack followers 402*a* . . . 402*f*. When the rotor rotates for the printing of postage, it does so in the direction shown by arrow P. Importantly, as will be seen from FIG. 9B, no two of the rack followers 402*a* . . . 402*f* are identical. Each rack follower 402 is shaped to take up the difference between (1) the vertical, straight-line position of its corresponding rack teeth 409 of its corresponding clutch 401, and (2) the position of the corresponding rack teeth 403 which are positioned along a curve. Returning momentarily to FIG. 6, it will be noted that the teeth engaging the clutch 401 to the rack follower 402 are preferably gear teeth with beveled faces. In contrast the teeth engaging the rack follower 402 with the rack teeth 403 are preferably square or rectangular teeth, with flat faces.

Figure 9C:
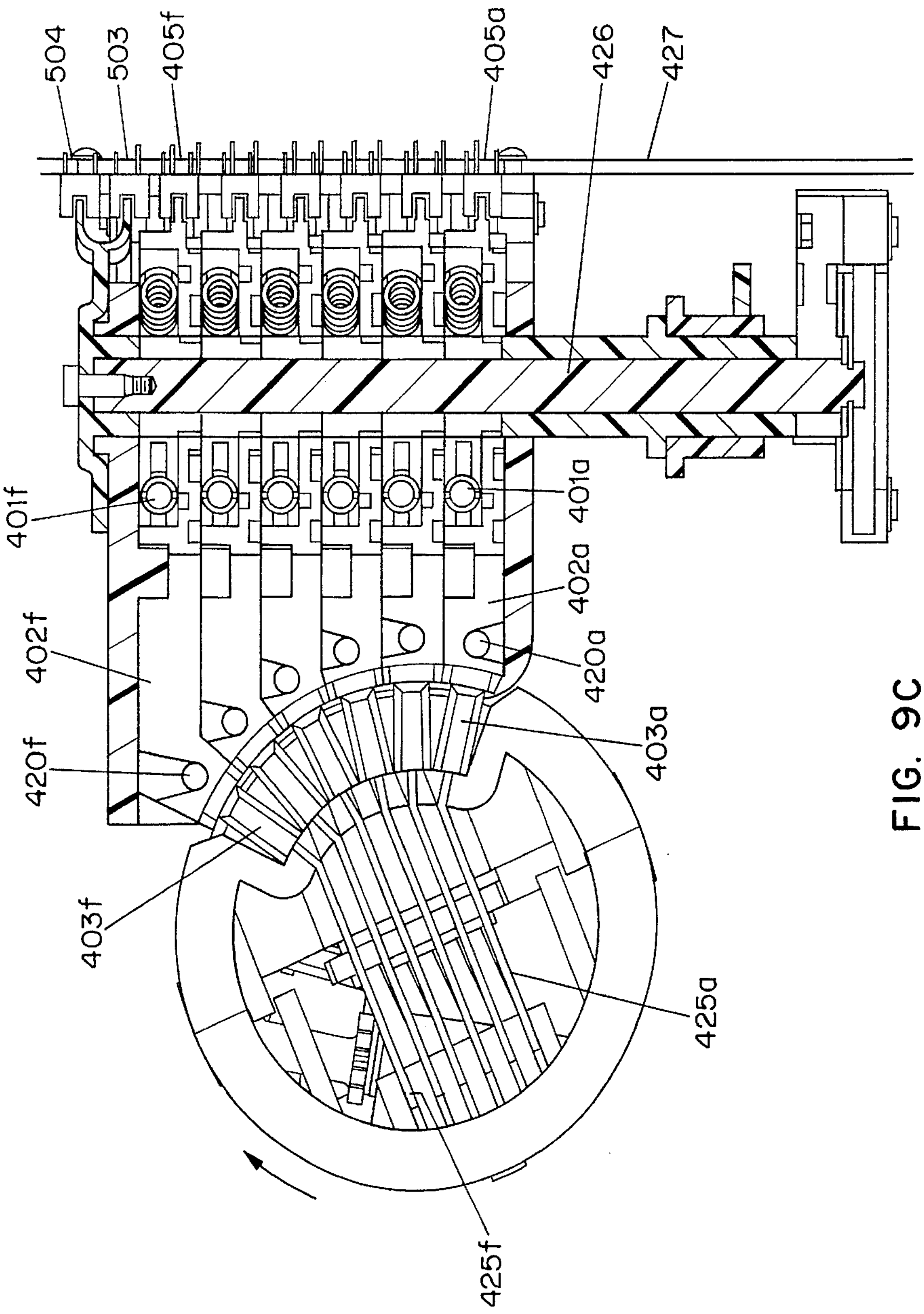

Turning now to FIG. 9C, the position of the racks 425*a* . . . 425*f* within the shaft of the rotor may be seen, together with the rack teeth 403*a* . . . 403*f* attached thereto. The rack followers 402*a* . . . 402*f* may be seen in cross section also. Shaft 426 runs vertically in FIG. 9C. Sensors 405*a* . . . 405*f* are disposed to the right of the figure, connected with printed circuit board 427. At the top are sensors 503, 504 which permit the processor to determine the position of the shaft 426 during the setting cycle.

Figure 10:
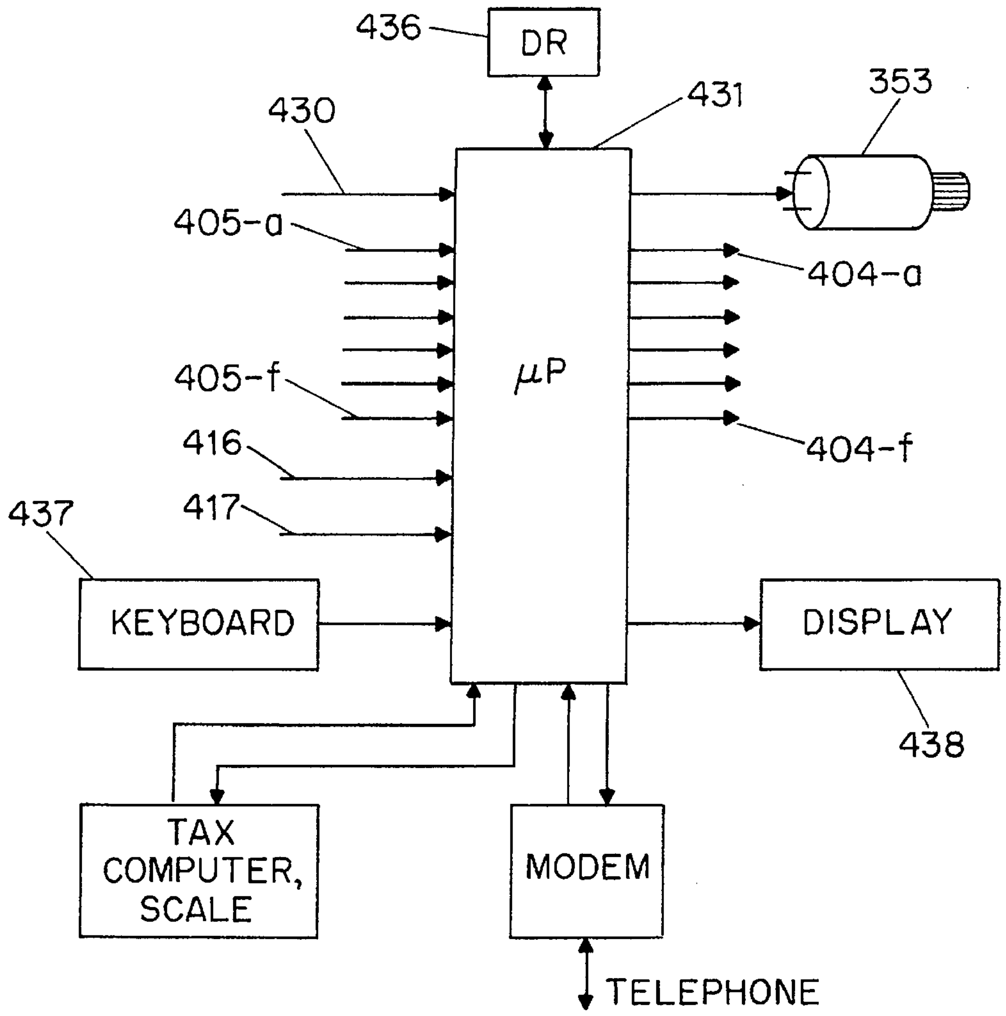
FIG. 10 shows in schematic form the microprocessor and some of its connections.

Turning now to FIG. 10, there is shown the microprocessor 431 and some of its connections. The microprocessor 431 is connected to an accounting register 436, and both are within the secure housing. The accounting register can be battery-backed CMOS static RAM, or EEPROM, or a combination of the two as set forth, for example, in PCT pub. no. 89/11134, assigned to the same assignee as the assignee of the present application. The descending register can be protected as set forth, for example, in U.S. Pat. No. 5,276,844, or U.S. application Ser. No. 08/002,737, now U.S. Pat. No. 5,559,992 assigned to the same assignee as the assignee of the present application, or copending U.S. application Ser. No. 08/422,435, filed Apr. 14, 1995 and entitled Protection System for Critical Memory Information, all of which are incorporated herein by reference. The processor is optionally connected with a modem as shown in FIG. 10 so that meter resetting can take place by telephone, as set forth in U.S. Pat. Nos. 4,807,139 or 5,237,506, assigned to the same assignee as the assignee of the present application, and incorporated herein by reference. The processor is optionally connected to a tax computer or scale, as shown in FIG. 10. Also connected to the processor 431 are a keyboard 437 and a display 438. Inputs are provided to the processor 431 from the decade sensors 405, the rotor sensors 416, 417, the mail piece sensor 430, and other sensors not shown in FIG. 10. Outputs are provided for the processor 431 including control lines to the electromagnets 404, and to the motor 353. An external servicing device is optionally capable of being connected as set forth in U.S. application Ser. No. 07/738,477 now abandoned, assigned to the same assignee as the assignee of the present application, and incorporated herein by reference.

Figure 11:
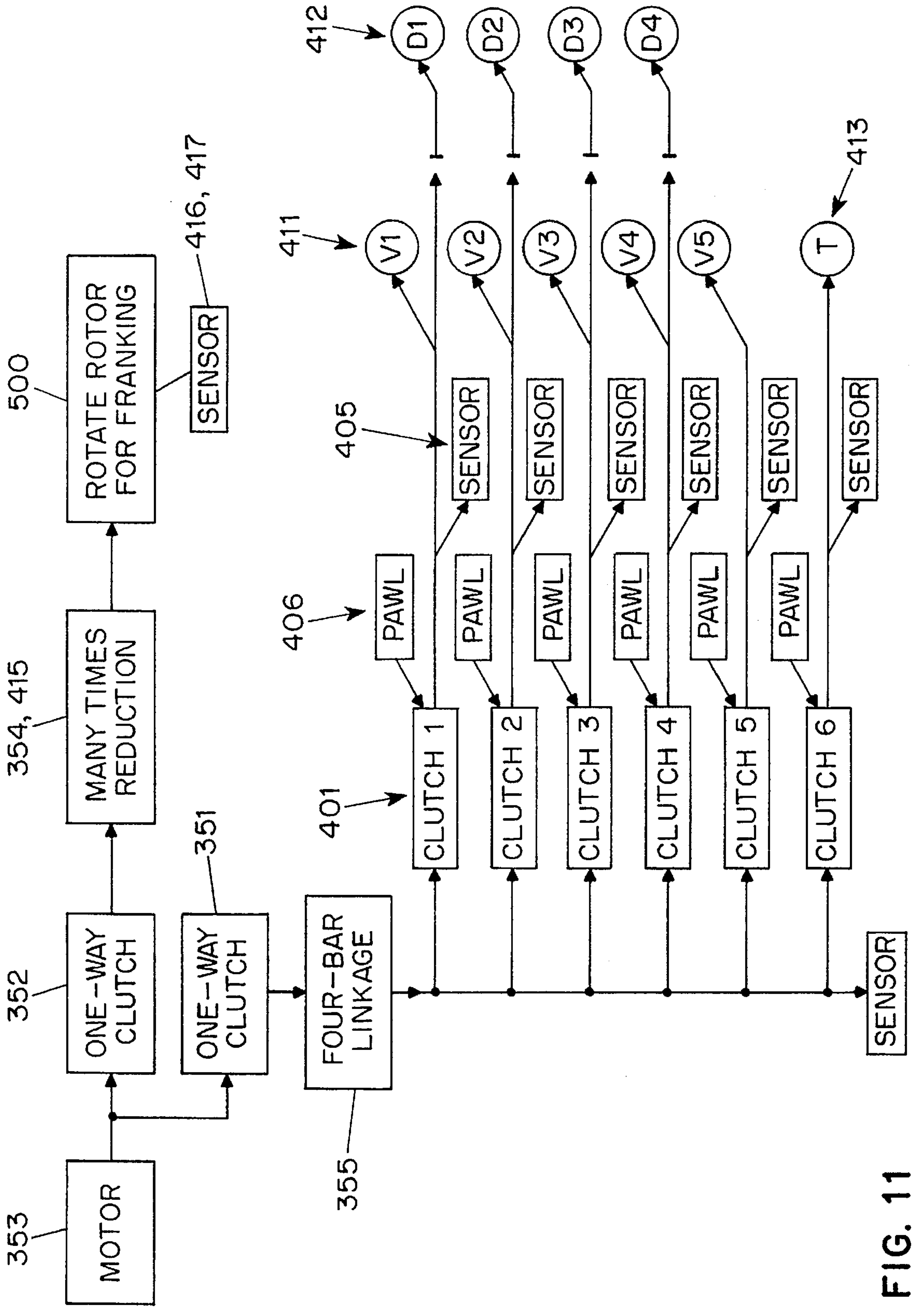
FIG. 11 shows in functional block diagram form the flow or transfer of motive power in the postage meter according to the invention.

FIG. 11 shows the flow or transfer of motive power in the postage meter according to the invention. Single motor 353 provides all motive power for all meter functions. The power is selectively provided by one of the one-way clutches 351, 352 to other moving parts.

If clutch 352 seizes, then rotation is many times reduced by gears 354, 415 resulting in the rotation of the rotor 500 for the printing of postage (franking). Sensors 416, 417 permit the processor to be apprised of the progress of the printing cycle, and permit stopping the motor 353 so as to stop the rotor 500 in its home position.

If clutch 351 seize, then rotation is reduced many times and provided to the four-bar linkage including link 355. Movement of the linkage is sensed by sensor 503 (see FIG. 9C). Clutches 401 transmit rotation through to value wheels 411, but rotation is blocked by pawls 406 at particular positions of the value wheels 411. Sensors 405 permit the processor 431 to determine the position of each value wheel 411. Extreme travel of the rotor setting elements triggers advancement of the date wheels 412. One of the clutches 401, and its associated moving parts, sets the mail class die 413.

Returning now to FIG. 9C, recall that the curved region represents the interface between the rotor 500 and the stationary rest of the postage meter. The rack teeth 403*a* . . . 403*f* are in engagement with respective rack followers 402*a* . . . 402*f* at the point in time shown in FIG. 9C, but during the printing of postage the rotor 500 rotates in the direction shown with the arrow P. One skilled in the art would appreciate what would happen if, say, the rack teeth 403*a* were to move axially, that is, into or out of the page, at some point during a printing cycle. The practical result would be severe damage due to a collision with the mating teeth of the rack follower 402*f*. The damage could include broken teeth on the rack teeth 403*a*, broken teeth on the rack follower 402*f*, or both. Rod 420*f* could get bent. Rack 425*a* could get bent. Rack teeth 403*a* might get dislodged from its fixed connection to rack 425*a*.

Figure 12:
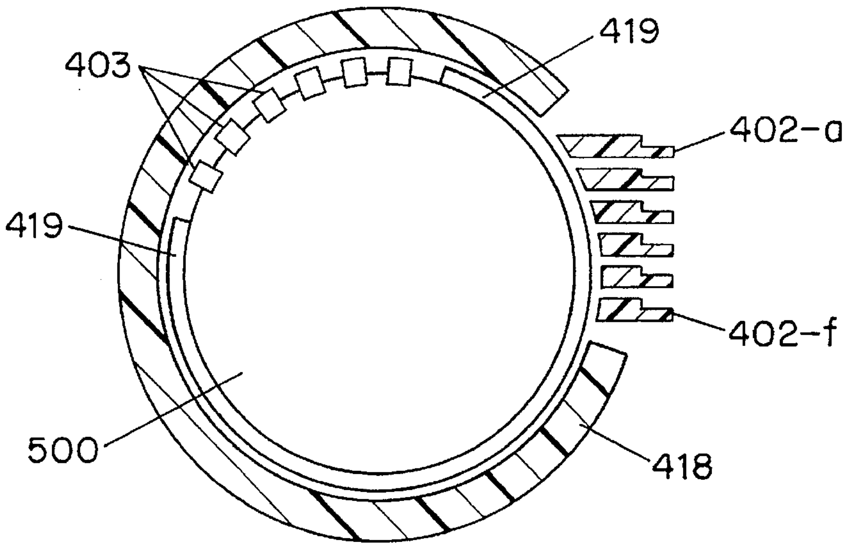
FIG. 12 shows in cross section a ridge and shroud relative to the rotor.

To minimize these harms two protective measures are taken. First, referring back to FIG. 2, ridge 419 is formed on the exterior of the rotor 500. This ridge 419 serves, during rotation of the rotor 500, to captivate the rack followers 402. The rack followers 402 are thus unable to move along the rods 420 (into or out of the page in FIG. 12). Referring now to FIG. 12, the ridge 419 may be seen, subtending so much of the circumference of the rotor 500 as is not taken up with the rack teeth 403. Ridge 419, as mentioned before, is formed in the exterior of rotor 500 and rotates with it.

The other protective measure may also be seen in FIG. 12, namely the shroud 418. Shroud 418 has grooves inside, positioned to engage the rack teeth 403. The shroud 418 subtends so much of the circumference of the rotor 500 as is not taken up with the rack followers 402. The shroud 418 serves, during rotation of the rotor 500, to captivate the rack teeth 403. The rack teeth 403 are thus unable to move into or out of the page in FIG. 12. The shroud 418 offers the further benefit of reducing the already quite small likelihood that a wrongdoer could tamper with the positions of the value wheels 411 when the rotor 500 is out of its home position.

It will be appreciated that even if a wrongdoer were able to move one of the rack teeth 403 when the rotor is out of its home position, this would immediately be detected by the microprocessor upon the next setting cycle. As will be described below, the signals from the sensors 405 are monitored during the second half of the setting cycle. If one of the rack teeth 403 were disturbed from its position during a print cycle, the corresponding clutch 401 would be unable to rotate fully in one direction or the other. The signals from the corresponding sensor 405 would be aberrant and the microprocessor would annunciate the findings.

Figure 13:
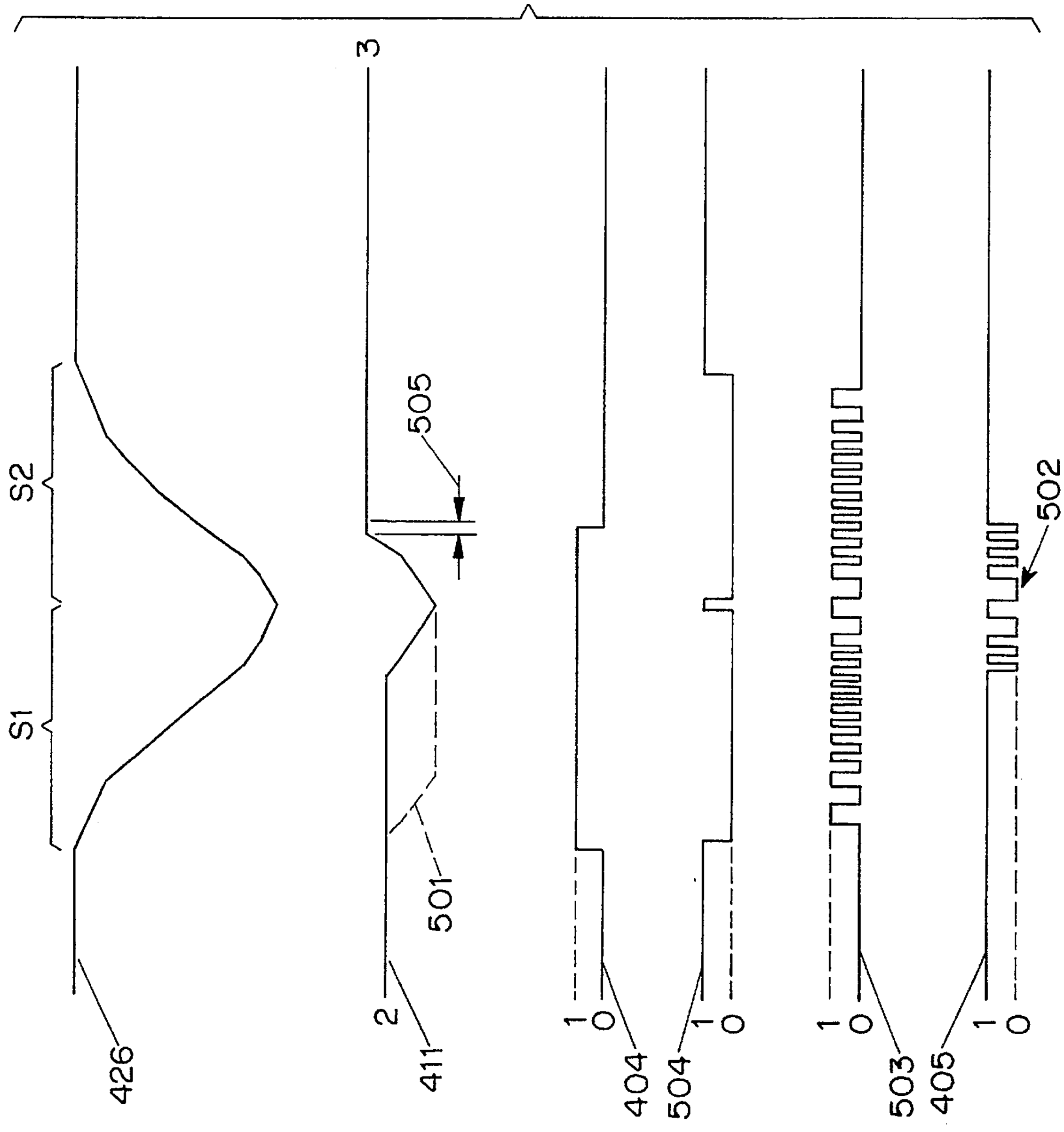
FIG. 13 shows some of the timing relationships in a simple value wheel setting cycle.

FIG. 13 shows some of the timing relationships in a simple setting cycle. Line 426, which is basically sinusoidal in shape, represents the angular position of the axle 426. The first half of the curve, denoted S1, represents the first half of the setting cycle S1 as shown, for example, in FIG. 2. The second half of the curve, denoted S2, represents the second half of the setting cycle S2 as shown, for example, in FIG. 2.

Skipping to line 404, what is significant is that the processor 431 energizes the electromagnet 404 at the beginning of the setting cycle. Line 404 rises to the "on" position at the beginning of the setting cycle.

Proceeding downward to line 411, what is shown is a typical position excursion for a value wheel 411 during a setting cycle. This line assumes that the value wheel 411 was previously positioned so that the printing indicium "2" was in place for printing of postage. During the first half of the setting cycle, the value wheel 411 moves to its lowest (slightly below "0") position. Dotted line 501 denotes the fact that depending on the internal friction between the inner and outer parts of the clutch 401, the value wheel 411 may return to its lowest position right away (if friction is large, shown with the dotted line) or may return to its lowest position at the latest possible time (if friction is minimal, shown with the solid line). The latter represents what happens if the inner and outer parts of the clutch 401 reach their relative home position before the outer part of the clutch moves at all. In either case, or if the behavior of the clutch falls between the extremes, all that matters is that the wheel 411 reaches its lowest position by the end of the first half of the setting cycle. Stated differently, the practical result is that the line 411 reaches its minimum at a time that is equal to (or no later than) the time the line 426 reaches its minimum.

The processor 431 has no difficulty monitoring the position of the value wheel 411 during the first half of the setting cycle, regardless of whether the value wheel 411 reaches its low position slowly or quickly, because the processor 431 is able to count the pulses shown in line 405, which are pulses from the sensor 405. Here the preferred embodiment is shown, in which the excursion from digit 2 down to the position below 0 gives rise to three pulses. An additional sensor 503 (see FIG. 9C) generates pulses indicative of movement of the axle 426. Here again the preferred embodiment is shown, in which the travel during the first half of the setting cycle gives rise to eleven pulses. Yet another sensor 504 (see FIG. 9C) generates a signal indicating that the midpoint of the setting cycle has arrived.

Figure 15:
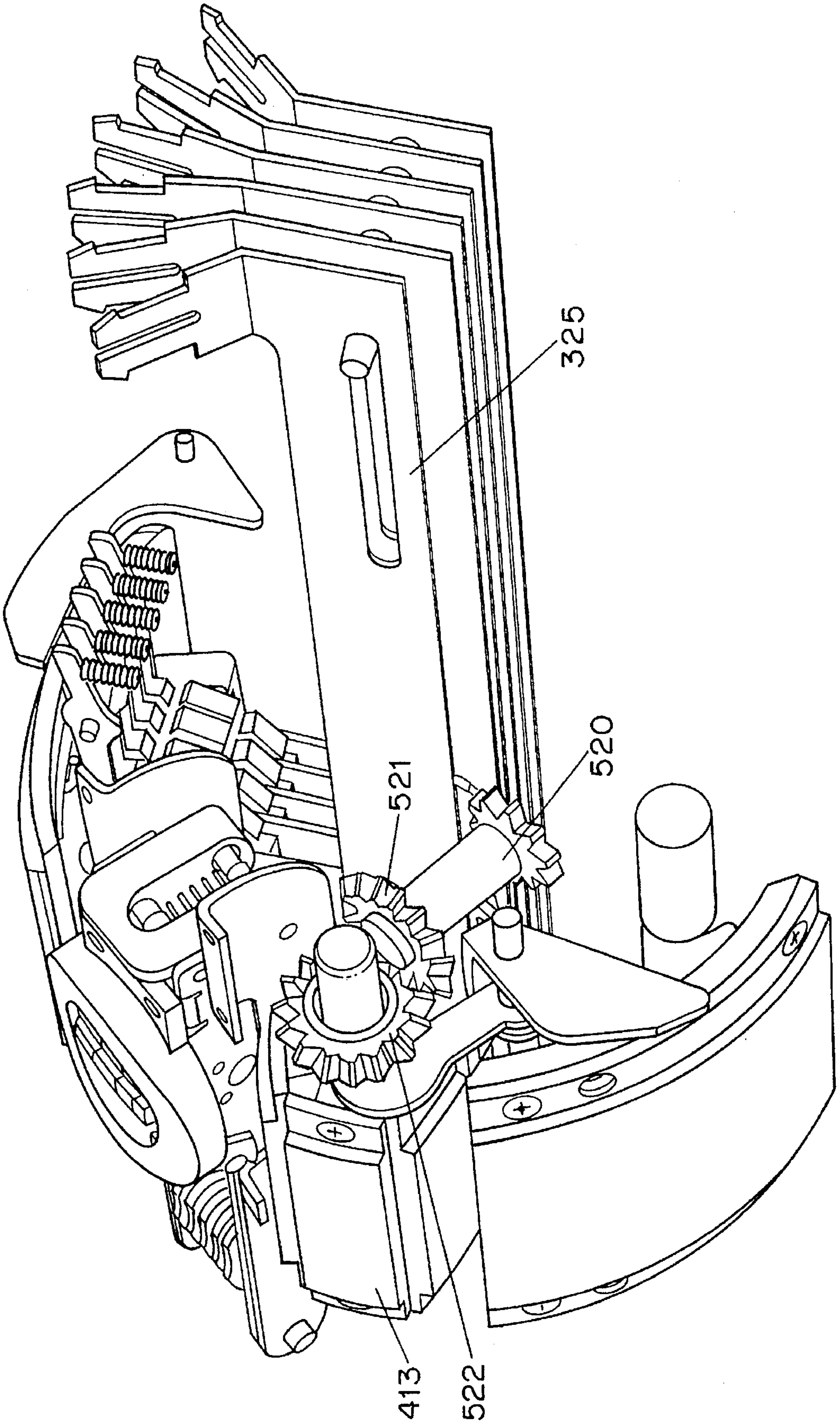
FIG. 15 is a perspective view showing the setting mechanism for the mail class die.

The second half of the setting cycle will now be described. In this example, it is assumed that it is desired to set the value wheel 411 to the position "3". The axle 426 reverses direction, moving upwards in FIG. 13 in line 426, denoting motion that tends to rotate wheel 411 to its highest numbered position. The microprocessor monitors the pulses from sensor 405 (or sensor 503; either may be used) and notes the third pulse indicating that the value wheel 411 is nearing its third position. As shown in line 404, the processor 431 cuts power to the electromagnet 404. Some time later the value wheel 411 halts, presumably in position 3. The time delay 505 has already been discussed above. Referring back to FIG. 2, it will be recalled that there is a mail class die 413, with five faces. In prior art rotor-type postage meters this die is generally set manually, for example by a knob rotated by the user. In the meter according to the invention, the number of racks 425 (generally six) exceeds by one the number of value wheels 411 (generally five), leaving an extra rack 425. The extra rack 425, as shown in FIG. 15, is coupled by means of a follower shaft 520 having a crown gear 521, to a matching crown gear 522 on the mail class die 413. In this way, linear movement of the extra rack 425 is translated into rotation of the mail class die 413 to one of its five positions.

Also referring to FIG. 2, it will be recalled that there are date print wheels 412. Turning to FIG. 6, it will be recalled that at the end of some of the racks 425 are corresponding levers 424. If the rack 425 is permitted to move rightwards in FIG. 6 beyond the position required to select the last of the indicia of the value wheel 411, the rack 425 strikes lever 424 and moves it counterclockwise in FIG. 6. This advances one of the date wheels 412, by a mechanism set forth in copending application Ser. No. 08/421,902, filed Apr. 14, 1995, and entitled System for Setting Date Wheels in a Postage Meter, and incorporated herein by reference. This causal relationship is also shown in FIG. 11, where the four movable date wheels 412 are actuated by respective ones of the racks for the value wheels 411.

Figure 14:
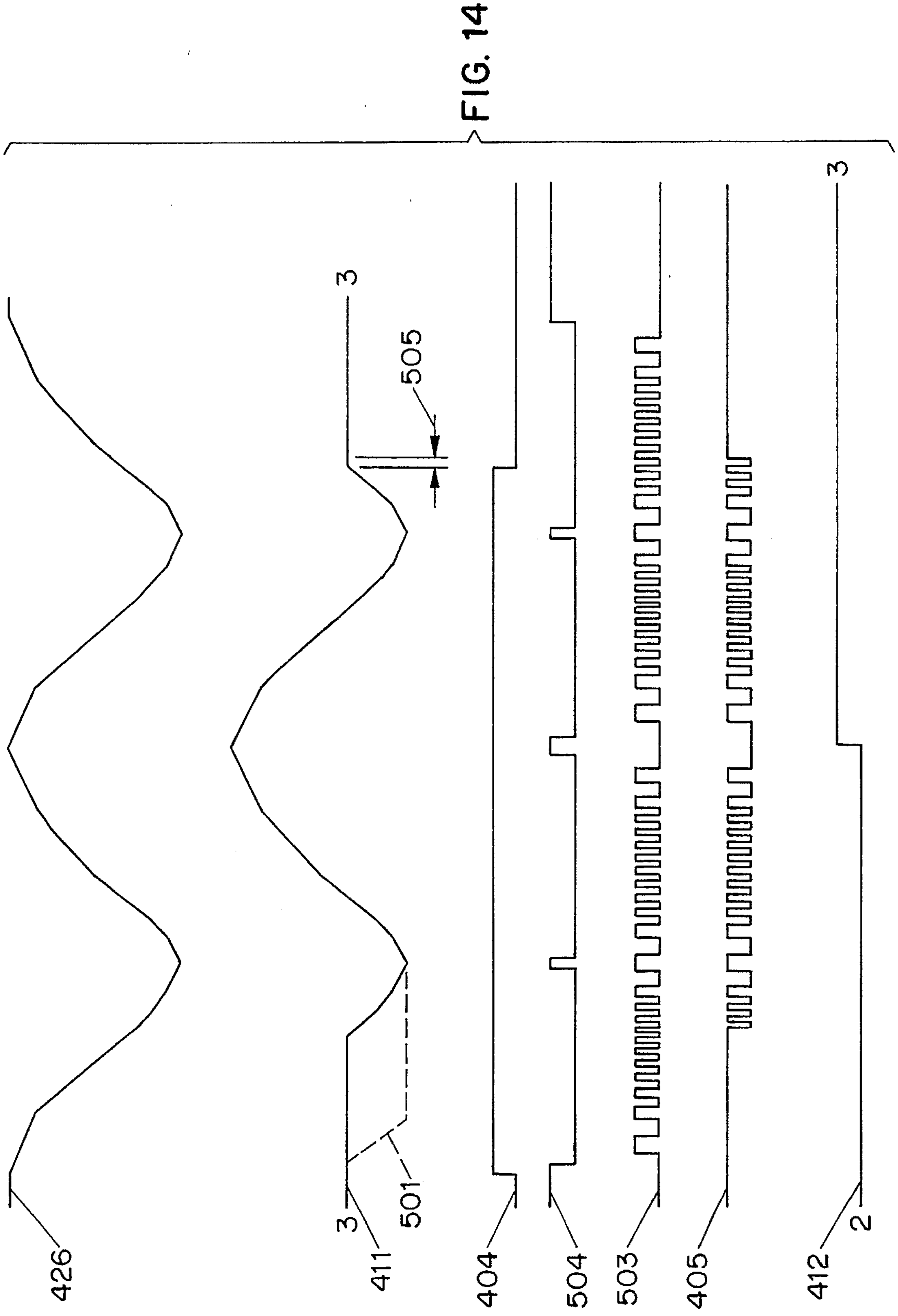
FIG. 14 shows some of the timing relationships for adjustment date of a date wheel.

The timing relationships for adjustment of a date wheel are shown in FIG. 14. The example assumes that the value wheel 411 was in position "5" before the adjustment of the date wheel 412, and assumes that the desired position of the value wheel 411 will be "5" After the adjustment of the date wheel 412.

The setting cycle begins with the processor energizing the electromagnet 404. The axle 426 begins its downwards excursion at 1, and no later than time 2 the axle "picks up" the value wheel 411. Again, dotted region 501 denotes that value wheel 411 may begin to drag along wheel 411 sooner. In any event, at time 3 the axle 426 has reached its lowest position, as has the value wheel 411. The axle 426 begins its upwards excursion, and the value wheel 411 moves upwards as well. The indicium uppermost on the value wheel 411 goes 0, 1, 2 . . . up to 9 at time 4. As the electromagnet 404 remains energized (see line 404 of FIG. 14) the value wheel 411 rotates beyond its highest position. Stated differently (see FIG. 6) the rack 425 goes fully to the right (in FIG. 6). The rack 425 strikes the lever 424, and (shown at time 5 in FIG. 14) the date wheel 412 is incremented. In this example, the date wheel 412 is incremented from position 2 to position 3.

In a normal setting cycle where the only item being adjusted is a value wheel 411, the motor 353 is halted at time 5. But in the context of a date wheel setting such as is shown in FIG. 14 it is improper to halt the motor 353, for the reason that the value wheel 411 is not in any of its normal ten digit positions. For this reason the motor 353 continues to turn, and the remainder of the date setting cycle takes place. All value wheels 411 are returned to their below-zero positions between times 5 and 6. After time 6, events proceed much as during the second half of a normal setting cycle, that is, much as shown in the second half of FIG. 13. Recall that it was desired to leave value wheel 411 in position 5. To do this, the processor 431 cuts power to electromagnet 404 at time 7 (shown with line 404 in FIG. 14). Shortly thereafter, at time 8, the pawl of electromagnet 404 halts value wheel 411. Time interval 505 is as discussed above. The setting cycle ends at time 9.

It will be seen from FIGS. 13 and 14 that the date setting cycle shown there takes twice as long as a value wheel setting cycle. This is not generally a problem because a date setting generally occurs only about once a day.

It might be thought that advancing a date wheel 412 by two positions would take twice as long as the procedure set forth in FIG. 14, but such is not the case. Advancing a date wheel 412 by two positions only takes 1½ times as long; the procedure set forth in FIG. 14 is merely modified by repeating the segment between times 3 and 6. In this way, advancing a date wheel by eleven positions would only take twelve times as long (not 22 times as long) as a value wheel setting cycle.

Since date wheels have twelve faces, this means that in the worst case (e.g. incrementing from 9 back to 8) only takes twelve times as long as a value wheel setting cycle.

It will be appreciated that with the foregoing, what has been provided is a postage meter having a setting means within the secure housing controllably coupled with the microprocessor disposed to cause selective rotation of the value print wheels, the date print wheels, and the mail class die, whereby under microprocessor control any possible combination of printed postage amount, printed date, and class of mail may be set for printing.

We claim:

1. A postage meter comprising:

a secure housing;

a microprocessor system including an accounting register within the secure housing;

a print rotor and platen opposed thereto, both within the secure housing, the print rotor rotatable about an axis and comprising a plurality of print wheels, each print wheel having indicia thereon defining digits of a printed postage amount, the rotor and platen defining a paper path;

a sensor in the paper path and communicatively coupled to the microprocessor;

an electric motor within the secure housing, the electric motor engaged with first and second opposed one-way clutches, the electric motor controllably coupled with the microprocessor;

the first one-way clutch engaged with the print rotor to cause angular movement thereof;

the second one-way clutch engaged with a setting means causing rotation of the print wheels;

whereby rotation of the electric motor, under microprocessor control, in one direction brings about rotation of the print wheels, and whereby rotation of the electric motor, under microprocessor control in response to communication from the sensor, in the other direction causes angular movement of the print rotor.

2. The postage meter of claim 1 wherein the setting means comprises a four-bar linkage between the second clutch and a setting axle, whereby the axle moves from a starting position through an angular displacement and then back to the starting position in response to rotation of the second clutch in a single direction;

the setting means further comprising a plurality of breakaway clutches, one for each print wheel, each breakaway clutch having a first part rotating with the axle and a second part coupled with a respective print wheel;

the setting means further comprising a plurality of pawls, one for each print wheel, each pawl electrically actuable between a first position engaged with the second part of a respective breakaway clutch in which the pawl blocks movement of the respective print wheel in a first direction, and a second position out of engagement with the second part of the respective breakaway clutch in which the linkage between the axle and the respective print wheel is unimpeded.

3. The postage meter of claim 2 wherein the setting means further comprises:

a plurality of rack followers, each rack follower corresponding to a breakaway clutch and engaging with the second part thereof, each rack follower slidable parallel to the axis of the rotor;

a plurality of racks, each rack corresponding to a rack follower and engaging therewith, each rack slidable parallel to the axis of the rotor, the racks slidably held within the rotor and rotating therewith, wherein each print wheel is engaged with a respective one of the racks;

whereby rotation of the axle, with each pawl in its second position, causes rotation of the first and second parts of the breakaway clutches, which causes sliding of the rack followers, which causes sliding of the racks, which causes rotation of the print wheels.

4. The postage meter of claim 3 wherein the second parts of the breakaway clutches each further comprise ratchet teeth engagable with the pawl corresponding thereto, and each further comprise barriers optically engagable with a light-emitting diode and phototransistor.

5. A postage meter comprising:

a secure housing;

a microprocessor system including an accounting register within the secure housing;

a print rotor and platen opposed thereto, both within the secure housing, the print rotor rotatable about an axis and comprising a plurality of value print wheels, date print wheels, and a mail class die, each value print wheel having indicia thereon defining digits of a printed postage amount, each date print wheel having indicia thereon defining digits of a printed date, and the mail class die having indicia thereon, each indicium defining a class of mail, the rotor and platen defining a paper path;

a sensor within the secure housing in the paper path and communicatively coupled to the microprocessor;

printing means within the secure housing controllably coupled with the microprocessor and engaged with the print rotor to cause angular movement thereof;

setting means within the secure housing controllably coupled with the microprocessor disposed to cause selective rotation of the value print wheels, the date print wheels, and the mail class die;

whereby under microprocessor control any possible combination of printed postage amount, printed date, and class of mail may be set for printing.

6. A postage meter comprising:

a secure housing;

a microprocessor system including an accounting register within the secure housing;

a print rotor and platen opposed thereto, the rotor within the secure housing, the print rotor rotatable about an axis and comprising a plurality of value print wheels, date print wheels, and a mail class die, each value print wheel having indicia thereon defining digits of a printed postage amount, each date print wheel having indicia thereon defining digits of a printed date, and the mail class die having indicia thereon, each indicium defining a class of mail, the rotor and platen defining a paper path;

a sensor in the paper path and communicatively coupled to the microprocessor;

a motor controllably coupled with the microprocessor, the postage meter further comprising a helical gear about the periphery of the print rotor, and a worm gear engaged therewith, the worm gear driven by the motor;

whereby actuation of the motor by the microprocessor rotates the worm gear, which causes rotation of the print rotor.

7. The postage meter of claim 6 further comprising:

setting means within the secure housing controllably coupled with the microprocessor disposed to cause selective rotation of the value print wheels, the date print wheels, and the mail class die, whereby under microprocessor control any possible combination of printed postage amount, printed date, and class of mail may be set for printing.

8. A postage meter comprising:

a secure housing;

a microprocessor system including an accounting register within the secure housing;

a print rotor and platen opposed thereto, both within the secure housing, the print rotor rotatable about an axis and comprising a plurality of print wheels, each print wheel having indicia thereon defining digits of a printed postage amount, the rotor and platen defining a paper path;

a sensor in the paper path and communicatively coupled to the microprocessor;

an electric motor within the secure housing, the electric motor engaged with first and second opposed one-way clutches, the electric motor controllably coupled with the microprocessor;

the first one-way clutch engaged with the print rotor to cause angular movement thereof;

the second one-way clutch engaged with a setting means causing rotation of the print wheels;

whereby rotation of the electric motor, under microprocessor control, in one direction brings about rotation of the print wheels, and whereby rotation of the electric motor, under microprocessor control in response to communication from the sensor, in the other direction causes angular movement of the print rotor;

wherein the setting means comprises a four-bar linkage between the second clutch and a setting axle, whereby the axle moves from a starting position through an angular displacement and then back to the starting position in response to rotation of the second clutch in a single direction;

the setting means further comprising a plurality of breakaway clutches, one for each print wheel, each breakaway clutch having a first part rotating with the axle and a second part coupled with a respective print wheel;

the setting means further comprising a plurality of pawls, one for each print wheel, each pawl electrically actuable between a first position engaged with the second part of a respective breakaway clutch in which the pawl blocks movement of the respective print wheel in a first direction, and a second position out of engagement with the second part of the respective breakaway clutch in which the linkage between the axle and the respective print wheel is unimpeded.

9. The postage meter of claim 8 wherein the setting means further comprises:

a plurality of rack followers, each rack follower corresponding to a breakaway clutch and engaging with the second part thereof, each rack follower slidable parallel to the axis of the rotor;

a plurality of racks, each rack corresponding to a rack follower and engaging therewith, each rack slidable parallel to the axis of the rotor, the racks slidably held within the rotor and rotating therewith, wherein each print wheel is engaged with a respective one of the racks;

whereby rotation of the axle, with each pawl in its second position, causes rotation of the first and second parts of the breakaway clutches, which causes sliding of the rack followers, which causes sliding of the racks, which causes rotation of the print wheels.

10. The postage meter of claim 9 wherein the second parts of the breakaway clutches each further comprise ratchet teeth engagable with the pawl corresponding thereto, and each further comprise barriers optically engagable with a light-emitting diode and phototransistor.

* * * * *